(12) United States Patent
Butzen et al.

(10) Patent No.: US 10,189,099 B2
(45) Date of Patent: Jan. 29, 2019

(54) SAW BLADE

(75) Inventors: Robert W. Butzen, Colgate, WI (US);
Austin J. Kazda, Wauwatosa, WI (US);
Andrew J. Schulz, Slinger, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1636 days.

(21) Appl. No.: 13/281,540

(22) Filed: Oct. 26, 2011

(65) Prior Publication Data
US 2012/0090443 A1 Apr. 19, 2012

Related U.S. Application Data

(63) Continuation-in-part of application No. 13/092,498, filed on Apr. 22, 2011, now Pat. No. 8,689,667.

(60) Provisional application No. 61/326,812, filed on Apr. 22, 2010, provisional application No. 61/326,834, (Continued)

(51) Int. Cl.
*B23D 61/12* (2006.01)

(52) U.S. Cl.
CPC ......... *B23D 61/121* (2013.01); *B23D 61/123* (2013.01); *Y10T 83/9319* (2015.04); *Y10T 83/9353* (2015.04)

(58) Field of Classification Search
CPC ..... B23D 61/121; B23D 61/123; B23D 61/12
USPC ............. 83/835, 846–855; 30/355, 392–394; D8/20
See application file for complete search history.

(56) References Cited

U.S. PATENT DOCUMENTS

| 81,413 A | 8/1868 | Sattler |
|---|---|---|
| 82,289 A | 9/1868 | Burgess |
| 293,576 A | 2/1884 | Haselton |

(Continued)

FOREIGN PATENT DOCUMENTS

| DE | 8805767 | 6/1988 |
|---|---|---|
| DE | 202004017351 | 3/2006 |

(Continued)

OTHER PUBLICATIONS

Bosch, Heavy Use Reciprocating Saw Blades, Available Dec. 23, 2009, Retrieved from the Internet <URL: http://www.boschtools.com/Products/Accessories/Pags/BoschProductCategory.aspx?catid=128>.

(Continued)

*Primary Examiner* — Stephen Choi
(74) *Attorney, Agent, or Firm* — Michael Best & Friedrich LLP

(57) ABSTRACT

A reciprocating saw blade for use with a reciprocating saw includes a body defining a longitudinal axis and an attachment portion. The attachment portion includes a tang and an aperture configured to couple to the reciprocating saw. The saw blade also includes a cutting portion formed on the body. The cutting portion includes a plurality of cutting teeth. Each cutting tooth including a tip, a rake face extending from the tip generally toward the longitudinal axis and at least partially defining a gullet, a relief surface extending from the tip and having a first end that is closer to the attachment portion and a second end that is further from the attachment portion, and a protrusion extending from the second end of the relief surface. The protrusion of each tooth inhibits a nail from entering the gullet and contacting the rake face of an adjacent tooth during cutting operations.

32 Claims, 19 Drawing Sheets

Related U.S. Application Data filed on Apr. 22, 2010, provisional application No. 61/351,436, filed on Jun. 4, 2010.

(56) References Cited

U.S. PATENT DOCUMENTS

| | | |
|---|---|---|
| 349,143 A | 9/1886 | Clemson |
| 566,865 A | 9/1896 | Morrish |
| 576,724 A | 2/1897 | Foster |
| 820,969 A * | 5/1906 | Grelck ............................ 83/851 |
| 1,390,400 A | 9/1921 | Threet |
| 1,876,945 A | 9/1932 | Hutchings |
| 2,646,094 A | 7/1953 | Russell |
| 2,916,066 A | 12/1959 | Morse |
| 3,028,889 A | 4/1962 | McCarty |
| 3,033,251 A | 5/1962 | Atkinson et al. |
| 3,111,970 A | 11/1963 | Priest et al. |
| 3,176,732 A | 4/1965 | Hendersen |
| 3,357,462 A | 12/1967 | Craven |
| 3,477,479 A | 11/1969 | Doty |
| 3,651,841 A | 3/1972 | Ohlsson |
| 3,680,610 A | 8/1972 | Lindgren |
| 4,119,004 A | 10/1978 | Ludwig |
| 4,137,808 A | 2/1979 | Mattes |
| 4,179,967 A | 12/1979 | Clark |
| 4,232,578 A | 11/1980 | Stellinger et al. |
| 4,236,432 A | 12/1980 | Kawakami et al. |
| 4,292,871 A | 10/1981 | Neumeyer et al. |
| 4,311,075 A | 1/1982 | Sundström |
| 4,339,977 A | 7/1982 | Miller |
| 4,345,499 A | 8/1982 | Ross |
| 4,423,553 A | 1/1984 | Miyawaki |
| 4,423,653 A | 1/1984 | Howard |
| 4,432,264 A | 2/1984 | Scott |
| 4,461,198 A | 7/1984 | Grassmann |
| 4,492,141 A | 1/1985 | Takeuchi |
| 4,515,055 A | 5/1985 | Scott |
| 4,557,172 A | 12/1985 | Yoneda |
| 4,587,876 A | 5/1986 | Erhardt |
| 4,640,172 A | 2/1987 | Kullmann et al. |
| 4,688,458 A | 8/1987 | Krilov |
| 4,727,788 A | 3/1988 | Yoshida et al. |
| 4,784,033 A | 11/1988 | Hayden et al. |
| 4,784,034 A | 11/1988 | Stones et al. |
| 4,802,396 A | 2/1989 | Kuklinski |
| 4,813,324 A | 3/1989 | Yoshida et al. |
| 4,827,822 A | 5/1989 | Yoshida et al. |
| 2,890,728 A | 6/1989 | Craven |
| 4,958,546 A | 9/1990 | Yoshida et al. |
| 4,989,489 A | 2/1991 | Pinney |
| 5,018,421 A | 5/1991 | Lucki et al. |
| 5,062,338 A | 11/1991 | Baker |
| 5,085,113 A | 2/1992 | Pinney |
| 5,094,135 A | 3/1992 | Nakahara et al. |
| 5,095,623 A | 3/1992 | Williams |
| 5,119,708 A | 6/1992 | Musgrove |
| 5,231,909 A | 8/1993 | Hsu |
| 5,249,485 A | 10/1993 | Hayden, Sr. |
| 5,295,426 A | 3/1994 | Planchon |
| 5,331,876 A | 7/1994 | Hayden, Sr. |
| 5,361,665 A | 11/1994 | Sonefors |
| 5,410,935 A | 5/1995 | Holston et al. |
| 5,417,777 A | 5/1995 | Henderer |
| 5,423,845 A | 6/1995 | McDaniel |
| 5,425,296 A | 6/1995 | Kullmann et al. |
| 5,477,763 A | 12/1995 | Kullman |
| 5,501,129 A | 3/1996 | Armstrong et al. |
| 5,517,889 A | 5/1996 | Logan |
| 5,555,788 A | 9/1996 | Gakhar et al. |
| 5,581,848 A | 12/1996 | Egerer |
| 5,603,252 A | 2/1997 | Hayden, Sr. |
| 5,606,900 A | 3/1997 | Stoddard |
| 5,697,280 A | 12/1997 | Armstrong et al. |
| 5,758,561 A | 6/1998 | Curtsinger et al. |
| 5,803,677 A | 9/1998 | Brutscher et al. |
| 5,803,678 A | 9/1998 | Korb et al. |
| 5,823,803 A | 10/1998 | Majors |
| 5,848,473 A | 12/1998 | Brandenburg, Jr. |
| 5,855,157 A | 1/1999 | Okamura et al. |
| 5,855,158 A | 1/1999 | Donofrio |
| 5,868,058 A | 2/1999 | Senegas |
| 5,884,547 A | 3/1999 | Carlsen et al. |
| 5,896,800 A | 4/1999 | Curtsinger et al. |
| 5,901,630 A | 5/1999 | Kataoka et al. |
| 5,918,525 A | 7/1999 | Schramm |
| 5,946,985 A | 9/1999 | Carlsen et al. |
| 5,964,039 A | 10/1999 | Mizoguchi et al. |
| 6,003,422 A | 12/1999 | Holston |
| 6,065,370 A | 5/2000 | Curtsinger et al. |
| 6,065,380 A | 5/2000 | Lundh |
| 6,119,571 A | 9/2000 | Hayden, Sr. |
| 6,125,544 A | 10/2000 | Eriksson et al. |
| 6,158,324 A | 12/2000 | Kullmann et al. |
| 6,167,792 B1 | 1/2001 | Korb et al. |
| D438,549 S | 3/2001 | Tsujimoto |
| 6,220,139 B1 | 4/2001 | Kobayashi et al. |
| 6,220,140 B1 | 4/2001 | Hellebergh |
| 6,244,152 B1 | 6/2001 | Di Nicolantonio |
| 6,257,226 B1 | 7/2001 | Hayden, Sr. |
| 6,269,722 B1 | 8/2001 | Hellbergh |
| 6,276,248 B1 | 8/2001 | Cranna |
| 6,276,249 B1 | 8/2001 | Handschuh et al. |
| 6,357,122 B2 | 3/2002 | Bachta |
| 6,401,585 B1 | 6/2002 | Morgan |
| 6,427,573 B1 | 8/2002 | Carlsen et al. |
| 6,439,094 B1 | 8/2002 | Yoneda et al. |
| 6,497,046 B1 | 12/2002 | Bardeen et al. |
| 6,520,722 B2 | 2/2003 | Hopper et al. |
| 6,532,852 B1 | 3/2003 | Tsujimoto et al. |
| 6,543,326 B2 | 4/2003 | Bishop |
| 6,588,992 B2 | 7/2003 | Rudolph |
| 6,598,509 B2 | 7/2003 | Cook et al. |
| 6,601,495 B2 | 8/2003 | Cranna |
| 6,625,891 B2 | 9/2003 | Stielper |
| D482,945 S | 12/2003 | Grolimund |
| 6,681,674 B2 | 1/2004 | Hakansson et al. |
| 6,782,781 B2 | 8/2004 | Rack |
| 6,834,573 B1 | 12/2004 | Nakahara |
| 6,931,975 B2 | 8/2005 | Haughton et al. |
| 6,945,850 B2 | 9/2005 | Perrey |
| 7,013,784 B2 | 3/2006 | Lowder et al. |
| 7,017,465 B2 | 3/2006 | Dion et al. |
| 7,036,415 B2 | 5/2006 | Tsujimoto |
| 7,036,417 B2 | 5/2006 | Alton |
| 7,117,863 B1 | 10/2006 | Dassoulas |
| 7,121,180 B2 | 10/2006 | Shimofurutani |
| 7,127,979 B2 | 10/2006 | Kocher et al. |
| 7,131,365 B2 | 11/2006 | Hall et al. |
| D534,401 S | 1/2007 | Duffin et al. |
| 7,174,823 B2 | 2/2007 | Cranna |
| 7,178,441 B2 | 2/2007 | Hellbergh |
| 7,225,714 B2 | 6/2007 | Rompel et al. |
| 7,225,715 B2 | 6/2007 | Lowder et al. |
| 7,257,900 B2 | 8/2007 | Wheeler et al. |
| D551,923 S | 10/2007 | Ammann |
| D554,452 S | 11/2007 | Ammann |
| D555,444 S | 11/2007 | Ammann |
| 7,334,511 B2 | 2/2008 | Hesselberg et al. |
| D578,847 S | 10/2008 | Mashburn |
| D608,611 S | 1/2010 | Lowder |
| 7,661,347 B2 | 2/2010 | Nagano et al. |
| 7,806,033 B2 | 10/2010 | Kocher et al. |
| D642,028 S | 7/2011 | Fosberg, Jr. et al. |
| 8,113,100 B1 | 2/2012 | Cranna et al. |
| 2001/0004860 A1 | 6/2001 | Kullmann et al. |
| 2001/0006017 A1 | 7/2001 | Osada et al. |
| 2002/0029679 A1 * | 3/2002 | Cranna ............................ 83/846 |
| 2002/0078813 A1 | 6/2002 | Hoffman |
| 2002/0184981 A1 | 12/2002 | Tsujimoto |
| 2002/0184988 A1 | 12/2002 | Rohman et al. |
| 2003/0010179 A1 | 1/2003 | McLuen |
| 2003/0051593 A1 | 3/2003 | Kocher et al. |
| 2004/0016125 A1 * | 1/2004 | Asada et al. .................... 83/835 |
| 2004/0035282 A1 | 2/2004 | Tsujimoto |
| 2004/0050234 A1 | 3/2004 | Fluhrer |

(56) References Cited

U.S. PATENT DOCUMENTS

| | | |
|---|---|---|
| 2004/0065183 A1 | 4/2004 | Asada |
| 2004/0182218 A1 | 9/2004 | Chao |
| 2004/0255740 A1 | 12/2004 | Troyer |
| 2005/0211023 A1 | 9/2005 | Kalo |
| 2005/0211046 A1 | 9/2005 | Thomas et al. |
| 2005/0229407 A1 | 10/2005 | Kanzawa |
| 2005/0262702 A1 | 12/2005 | Hawthorn |
| 2006/0016315 A1 | 1/2006 | Zorich et al. |
| 2006/0065098 A1 | 3/2006 | Cranna |
| 2006/0130631 A1 | 6/2006 | Hesselberg et al. |
| 2006/0160341 A1 | 6/2006 | Burry et al. |
| 2006/0162826 A1 | 7/2006 | Beguinot et al. |
| 2006/0207398 A1 | 9/2006 | Nicolson et al. |
| 2007/0056427 A1 | 3/2007 | Males |
| 2007/0199416 A1 | 8/2007 | Cook et al. |
| 2007/0214922 A1 | 9/2007 | Cook et al. |
| 2007/0221033 A1 | 9/2007 | Taffertshofer |
| 2007/0251372 A1 | 11/2007 | Petts et al. |
| 2008/0121079 A1 | 5/2008 | Hashimoto et al. |
| 2008/0121084 A1 | 5/2008 | Vogel et al. |
| 2008/0163735 A1 | 7/2008 | Lundin et al. |
| 2008/0172890 A1 | 7/2008 | Shetterly |
| 2008/0201964 A1 | 8/2008 | Camargo et al. |
| 2008/0264231 A1 | 10/2008 | Coe et al. |
| 2008/0307936 A1 | 12/2008 | Elliston et al. |
| 2009/0013847 A1 | 1/2009 | Lauzet |
| 2009/0049973 A1 | 2/2009 | Huffer et al. |
| 2009/0126205 A1 | 5/2009 | Kullman et al. |
| 2009/0126712 A1 | 5/2009 | Kullmann et al. |
| 2009/0144992 A1 | 6/2009 | Bucks |
| 2009/0145280 A1 | 6/2009 | Bucks et al. |
| 2009/0293698 A1 | 12/2009 | Tran et al. |
| 2011/0217133 A1 | 9/2011 | Ibarra et al. |
| 2011/0271815 A1 | 11/2011 | Elliston et al. |
| 2014/0020531 A1 | 1/2014 | Tsujimoto |

FOREIGN PATENT DOCUMENTS

| | | |
|---|---|---|
| EP | 0609791 | 8/1994 |
| EP | 2070624 | 6/2009 |
| GB | 2009670 A * | 6/1979 |
| JP | 10328930 | 12/1998 |
| JP | 11019822 | 1/1999 |
| JP | 2000135625 | 5/2000 |
| JP | 2000343325 | 12/2000 |
| JP | 2001009634 | 1/2001 |
| JP | 2001259927 | 9/2001 |
| JP | 2003048121 | 2/2003 |
| JP | 2003334721 | 11/2003 |
| JP | 2003340642 | 12/2003 |
| JP | 2003340643 | 12/2003 |
| JP | 2003340644 | 12/2003 |
| JP | 2005169546 | 6/2005 |
| JP | 2007290112 | 11/2007 |
| WO | 02/06020 | 1/2002 |
| WO | 2011/140533 | 11/2011 |

OTHER PUBLICATIONS

Bosch, Progessor for All-Purpose, Available Dec. 23, 2009, Retrieved from the Internet <URL: http://www.boschtools.com/Products/Accessories/Pages/BoschAccessoryDetail.aspx?pid=285#specs>.

Bosch, Progessor for Wood, Available Dec. 23, 2009, Retrieved from the Internet <URL: http://www.boschtools.com/Products/Accessories/Pages/BoschAccessoryDetail.aspx?pid=287#specs>.

Bosch, Heavy for Wood with Nails, Available Dec. 23, 2009, Retrieved from the Internet <URL: http://www.boschtools.com/Products/Accessories/Pages/BoschAccessoryDetail.aspx?pid=284#specs>.

European Extended Search Report for Application No. 12193906.0 dated Sep. 26, 2014 (9 pages).

Second Examination Report from the State Intellectual Property Office of Australia for Application No. 2012244291 dated Jul. 25, 2013 (6 pages).

Australian Patent Examination Report No. 3 for Application No. 2012244291 dated Jun. 4, 2014 (5 pages).

* cited by examiner

SAW BLADE

CROSS-REFERENCE TO RELATED APPLICATIONS

This application is a continuation-in-part of U.S. patent application Ser. No. 13/092,498, filed Apr. 22, 2011 by Robert W. Butzen et al., which claims priority to U.S. Provisional Patent Application No. 61/326,812, filed Apr. 22, 2010 by Robert W. Butzen et al. and titled, "PLUNGE POINT GEOMETRY FOR SAW BLADE," to U.S. Provisional Patent Application No. 61/326,834, filed Apr. 22, 2010 by Robert W. Butzen et al. and titled, "PLUNGE POINT GEOMETRY FOR SAW BLADE," and to U.S. Provisional Patent Application No. 61/351,436, filed Jun. 4, 2010 by Austin J. Kazda et al. and titled, "TOOTH FORM FOR SAW BLADE," the entire contents of each of which are hereby incorporated by reference.

BACKGROUND

The present invention relates to saw blades and, more particularly, to saw blades for use with power tools.

Saw blades, such as reciprocating saw blades, are used for cutting wood, metal, plastics, and other materials. A saw blade typically includes a body, one or more attachment portions, and a cutting portion. The cutting portion comprises a plurality of teeth made up of one or more tooth forms. Tooth forms on saw blades are a major factor in the durability, cost, speed of cutting, and accuracy and quality of cuts made. Each tooth typically includes a tip, a relief face, a rake face, and a gullet. The teeth are generally separated by a pitch length (otherwise identified as the number of teeth per inch (TPI)). Some tooth forms vary along the length of the saw blade or include portions having varied teeth. In some tooth forms, a nail may become lodged in the gullet of a tooth during operation, thereby breaking or otherwise damaging the tooth.

In many instances, the operator of a reciprocating saw uses the saw and attached saw blade to initiate and make cuts in construction material starting at an edge, or periphery, of the construction material. During such cuts, the cutting portion and the plurality of teeth associated therewith are the first part of the saw blade to contact the material. In other instances, the operator of the reciprocating saw uses the saw and attached saw blade to initiate a cut in a face of the construction material (i.e., away from the edge, or periphery, of the construction material). This type of cut is typically referred to as a plunge cut. During a plunge cut, a leading tooth located proximate the end of the saw blade penetrates the material face first. Therefore, the end geometry and the leading tooth geometry of the saw blade are significant to performance during plunge cutting and may affect the durability of the saw blade, the speed with which the plunge cut is executed, and the accuracy of the cut.

SUMMARY

In one embodiment, the invention provides a reciprocating saw blade for use with a reciprocating saw. The reciprocating saw blade is configured to cut a work piece having a nail extending therethrough. The reciprocating saw blade includes a body defining a longitudinal axis and an attachment portion coupled to the body. The attachment portion includes a tang and an aperture configured to couple to the reciprocating saw. The reciprocating saw blade also includes a cutting portion formed on the body. The cutting portion includes a plurality of cutting teeth. Each cutting tooth including a tip, a rake face extending from the tip generally toward the longitudinal axis and at least partially defining a gullet, a relief surface extending from the tip and having a first end that is closer to the attachment portion and a second end that is further from the attachment portion, and a protrusion extending from the second end of the relief surface. The protrusion of each cutting tooth inhibits the nail from entering the gullet and contacting the rake face of an adjacent cutting tooth during cutting operations.

In another embodiment, the invention provides a reciprocating saw blade for use with a reciprocating saw. The reciprocating saw blade includes a body defining a longitudinal axis and an attachment portion coupled to the body. The attachment portion includes a tang and an aperture configured to couple to the reciprocating saw. The reciprocating saw blade also includes a cutting portion formed on the body. The cutting portion includes a plurality of cutting teeth. Each cutting tooth includes a tip, a relief surface extending from the tip, and a protrusion extending from an end of the relief surface opposite the tip. The tips of the plurality of cutting teeth define a first plane that is generally parallel to the longitudinal axis, and the protrusions of the plurality of cutting teeth define a second plane that is generally parallel to the longitudinal axis. A distance between the first plane and the second plane is at most approximately 0.035 inches.

In yet another embodiment, the invention provides a reciprocating saw blade for use with a reciprocating saw. The reciprocating saw blade includes a body defining a longitudinal axis and an attachment portion coupled to the body. The attachment portion includes a tang and an aperture configured to couple to the reciprocating saw. The reciprocating saw blade also includes a cutting portion formed on the body. The cutting portion includes a plurality of cutting teeth. Each cutting tooth includes a tip, a relief surface extending from the tip, and a protrusion extending from an end of the relief surface opposite the tip. Each cutting tooth defines an effective relief surface that extends from the tip and is tangent to the protrusion. A distance between effective relief surfaces of adjacent cutting teeth is at most approximately 0.06 inches.

In still another embodiment, the invention provides a reciprocating saw blade for use with a reciprocating saw. The reciprocating saw blade includes a body defining a longitudinal axis and an attachment portion coupled to the body. The attachment portion includes a tang and an aperture configured to couple to the reciprocating saw. The attachment portion is angled relative to the longitudinal axis by a tang angle. The reciprocating saw blade also includes a cutting portion formed on the body. The cutting portion includes a plurality of cutting teeth. Each cutting tooth includes a tip, a relief surface extending from the tip, and a protrusion extending from an end of the relief surface opposite the tip. Each cutting tooth defines an effective relief surface that extends from the tip and is tangent to the protrusion. The tips of the plurality of cutting teeth define a plane that is generally parallel to the longitudinal axis. The relief surface of each cutting tooth intersects the plane at a relief angle, and the effective relief surface of each cutting tooth intersects the plane at an effective relief angle. The effective relief angle is between the tang angle and the relief angle.

In yet still another embodiment, the invention provides a reciprocating saw blade for use with a reciprocating saw. The reciprocating saw blade is configured to cut a work piece having a nail extending therethrough. The reciprocating saw blade includes a body defining a longitudinal axis and an attachment portion coupled to the body. The attachment portion includes a tang and an aperture configured to couple to the reciprocating saw. The attachment portion is angled relative to the longitudinal axis by a tang angle. The reciprocating saw blade includes a cutting portion formed on the body. The cutting portion includes a plurality of cutting teeth. Each cutting tooth includes a tip, a rake face extending from the tip generally toward the longitudinal axis and at least partially defining a gullet, a relief surface extending from the tip, and a protrusion extending from an end of the relief surface opposite the tip. The protrusion of each cutting tooth inhibits the nail from entering the gullet and contacting the rake face of an adjacent cutting tooth during cutting operations. Each cutting tooth defines an effective relief surface that extends from the tip and is tangent to the protrusion. The tips of the plurality of cutting teeth define a first plane that is generally parallel to the longitudinal axis, and the protrusions of the plurality of cutting teeth define a second plane that is generally parallel to the longitudinal axis. A distance between the first plane and the second plane is at most approximately 0.035 inches. A distance between effective relief surfaces of adjacent cutting teeth is at most approximately 0.06 inches. The relief surface of each cutting tooth intersects the first plane at a relief angle and the effective relief surface of each cutting tooth intersects the first plane at an effective relief angle. The effective relief angle is between the tang angle and the relief angle.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
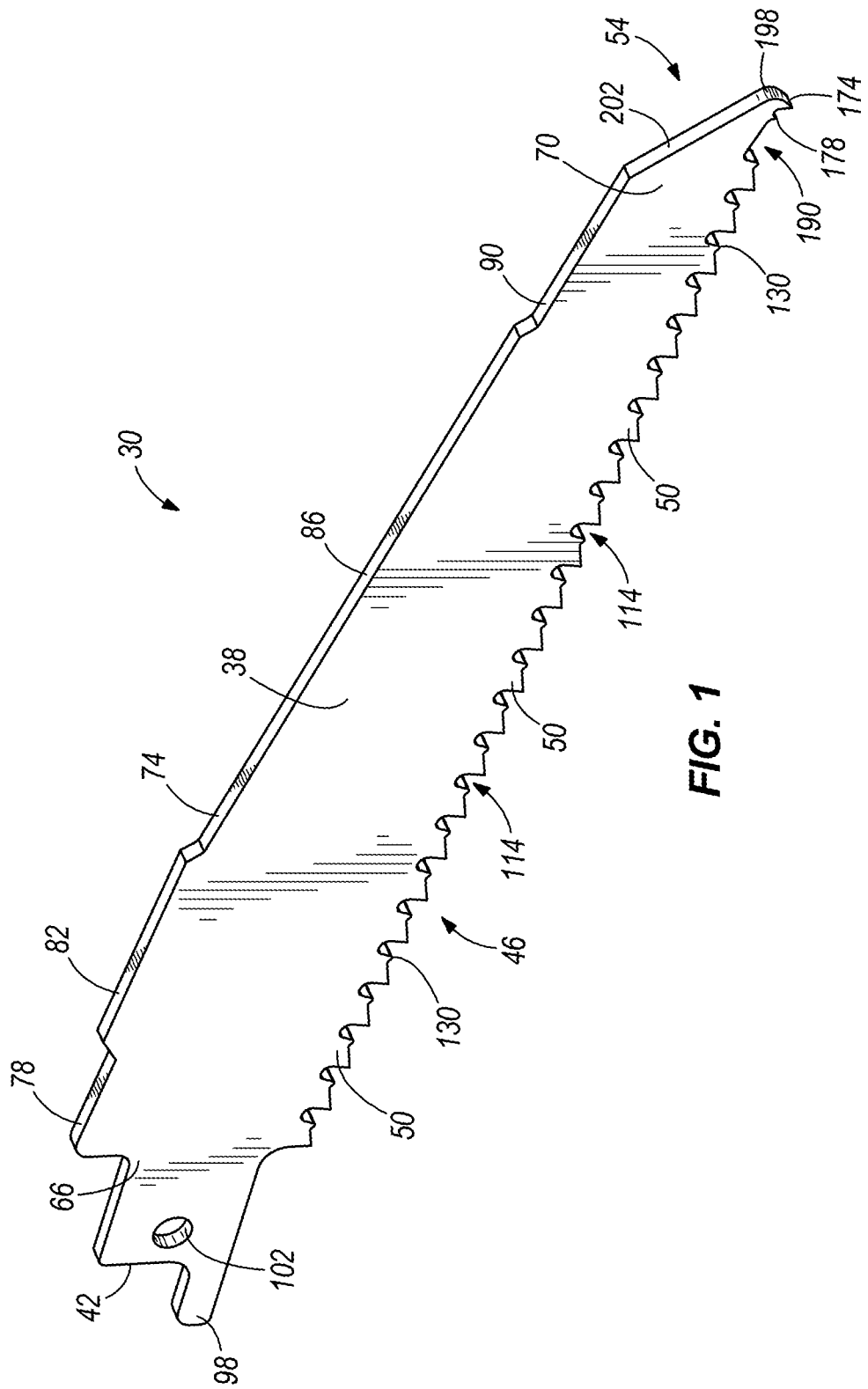
FIG. 1 is a perspective view of a saw blade according to one embodiment of the invention.
Figure 2:
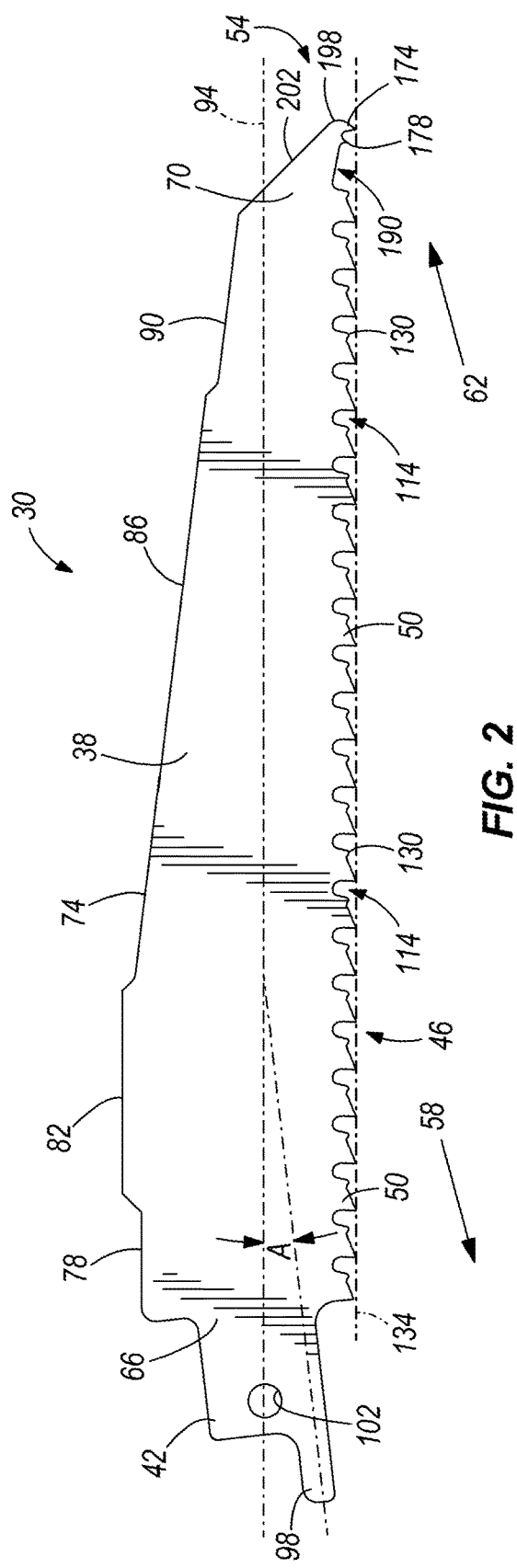
FIG. 2 is a side view of the saw blade shown in FIG. 1.
Figure 3:
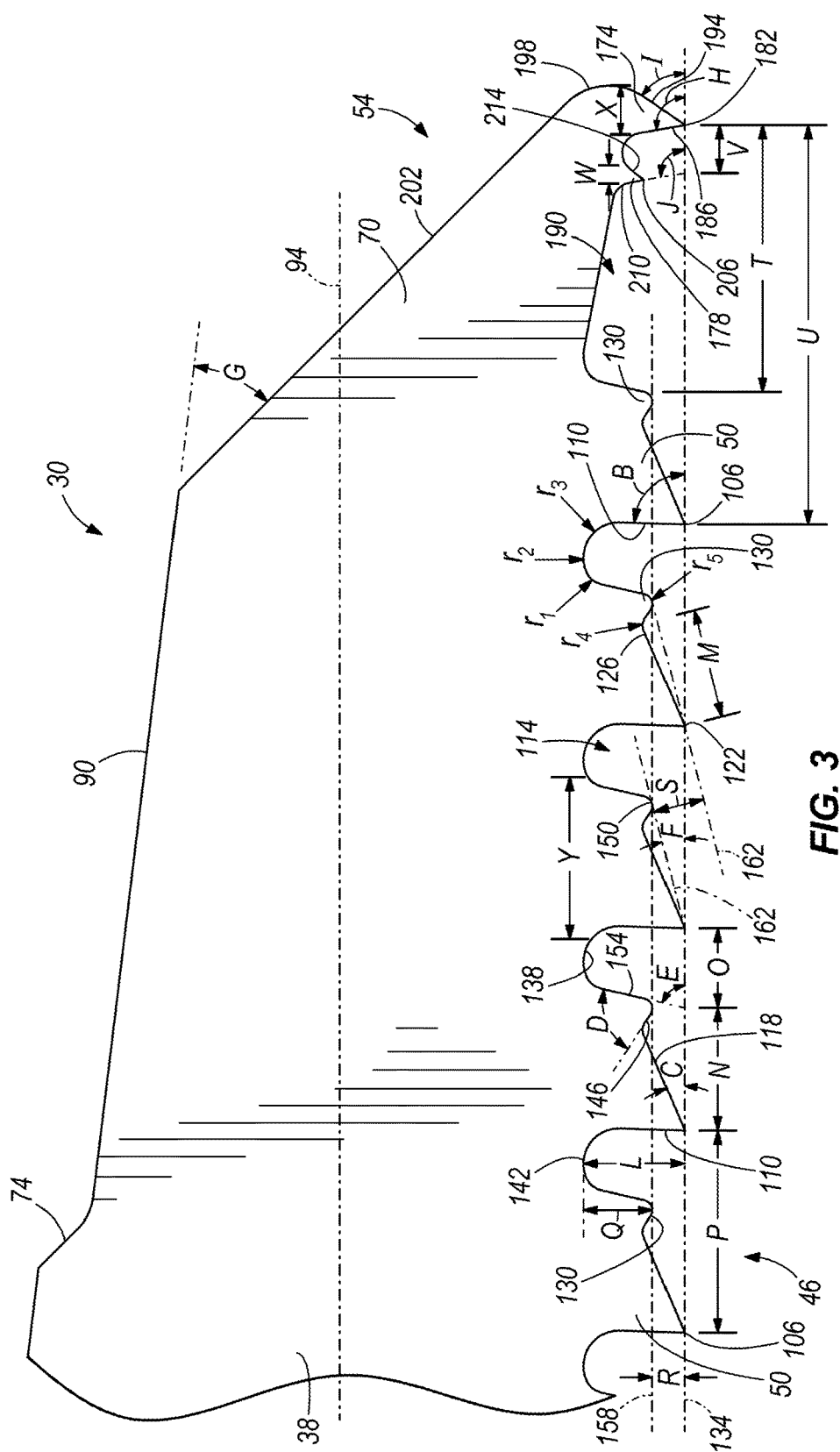
FIG. 3 is an enlarged side view of a portion of the saw blade shown in FIG. 1.
Figure 28:
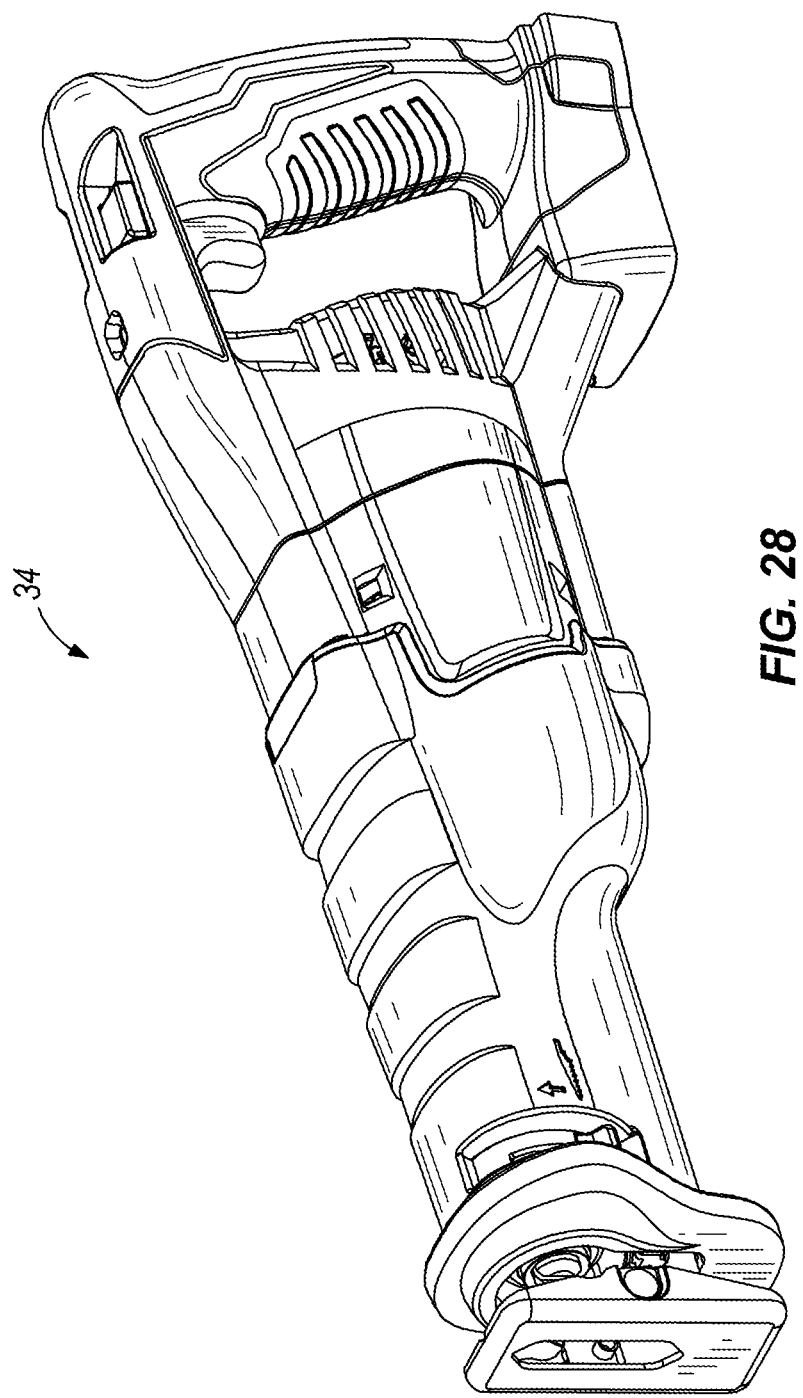
FIG. 28 is a perspective view of a reciprocating saw.

FIGS. 1-3 illustrate a saw blade 30 according to one embodiment of the invention. The illustrated saw blade 30 is a reciprocating saw blade for use with a power tool such as, for example, a reciprocating saw 34 (FIG. 28). The saw blade 30 includes a body 38, an attachment portion 42 for coupling the blade 30 to the reciprocating saw 34, a cutting portion 46 having a plurality of cutting teeth 50, and a plunge point 54 for initiating a plunge cut. In the illustrated embodiment, the body 38, the attachment portion 42, the cutting portion 46, and the plunge point 54 are all integrally formed as a single piece such that the saw blade 30 is a unitary structure. In other embodiments, the saw blade 30 may be formed from several pieces that are welded or otherwise secured together. During operation, the saw blade 30 is reciprocated in a cutting direction 58 and a return direction 62 (FIG. 2) to cut through a work piece. In some embodiments, the saw 34 and the blade 30 may be used to cut through work pieces composed of wood having nails extending through or embedded therein.

The body 38 includes a first end portion 66 and a second end portion 70. The attachment portion 42 is coupled to (e.g., formed at) the first end portion 66 of the body 38 and the plunge point 54 is coupled to (e.g., formed at) the second end portion 70 of the body 38. A back portion 74 extends between the attachment portion 42 and the plunge point 54 on a side of the body 38 opposite the cutting portion 46. The illustrated back portion 74 includes four stepped surfaces 78, 82, 86, 90 at different distances from the cutting portion 46. The body 38 also defines a longitudinal axis 94 (FIGS. 2 and 3) extending through the first end portion 66 and the second end portion 70.

The attachment portion 42 extends from the first end portion 66 of the body 38 and includes a tang 98 and an aperture 102. The tang 98 and the aperture 102 are configured to engage a blade clamp of a reciprocating saw to securely and releasably couple the blade 30 to the saw. As shown in FIG. 2, the illustrated attachment portion 42 is angled relative to the longitudinal axis 94 by a tang angle A. In the illustrated embodiment, the tang angle A is approximately 6.5 degrees. In other embodiments, the tang angle A may be larger or smaller.

Referring to FIGS. 2 and 3, the cutting teeth 50 define a tooth form on the body 38. The illustrated tooth form includes five teeth per inch (TPI) such that adjacent cutting teeth 50 are separated by a pitch P of 0.2 inches. In other embodiments, the saw blade 30 may include fewer or more teeth per inch. For example, the tooth form may include 4 TPI, 6 TPI, or the like. In the illustrated embodiment, the cutting teeth 50 are unset such that the teeth 50 extend straight from the body 38. In other embodiments, some or all of the teeth 50 may be bent or "set" at various angles relative to a hypothetical plane defined by the body 38. The distances and angles identified herein refer to a saw blade in which the cutting teeth are unset. However, it should be readily apparent that a saw blade may be designed according to the disclosed dimensions with unset cutting teeth, and the cutting teeth may ultimately be set as desired during manufacture.

As shown in FIG. 3, each cutting tooth 50 includes a tip 106, a rake face 110 extending from the tip 106 generally toward the longitudinal axis 94 and at least partially defining a gullet 114, a relief surface 118 extending from the tip 106 and having a first end 122 that is closer to the attachment portion 42 and a second end 126 that is further from the attachment portion 42, and a protrusion 130 extending from the second end 126 of the relief surface 118. The tips 106 of the cutting teeth define a plane 134 that is generally parallel to the longitudinal axis 94.

Each rake face 110 extends from the corresponding tip 106 at a rake angle B relative to the plane 134. The rake angle B of each cutting tooth 50, measured through the corresponding cutting tooth 50, is a positive rake angle (i.e., less than 90 degrees). In the illustrated embodiment, the rake angle B of each cutting tooth is approximately 80 to 88 degrees. In other embodiments, the rake angle B may be larger or smaller, or each rake face 110 may extend at a 'negative rake angle' (i.e., greater than 90 degrees relative to the plane 134).

The gullet 114 of each cutting tooth 50 is defined by the rake face 110 of the cutting tooth 50 and a gullet surface 138. Each gullet surface 138 extends from the corresponding rake face 110 to the protrusion 130 of an adjacent tooth 50 and includes a base 142. The gullet surfaces 138 are defined by a first gullet radius $r_1$, a second gullet radius $r_2$, and a third gullet radius $r_3$. In the illustrated embodiment, the first gullet radius $r_1$ is approximately 0.021 inches, the second gullet radius $r_2$ is approximately 0.035 inches, and the third gullet radius $r_3$ is approximately 0.040 inches. The gullet 114 of each tooth 50 also has a gullet depth L, or tooth height, measured from the base 142 of the gullet 114 to the tip 106 of the tooth 50. In the illustrated embodiment, the gullet depth L is approximately 0.1 inches.

The relief surface 118 of each cutting tooth 50 extends generally toward the longitudinal axis 94 and toward the plunge point 54. The relief surfaces 118 are oriented at relief angles C relative to the plane 134. In the illustrated embodiment, the relief angle C of each cutting tooth 50 is approximately 23 degrees. In other embodiments, the relief angles C may be larger or smaller. Each relief surface 118 has a relief length M measured from the first end 122 (e.g., the tip 106) to the second end 126 (e.g., a beginning of the protrusion 130). In the illustrated embodiment, the relief length M of each cutting tooth 50 is approximately 0.1 inches. In other embodiments, the relief length M may be larger or smaller.

The relief surface 118 of each cutting tooth 50 is interrupted by the protrusion 130 extending from the second end 126 of the relief surface 118. In some embodiments, the protrusion 130 at the cutting tooth 50 nearest the plunge point 54 may be omitted. The protrusion 130 of each tooth 50 is defined by a first protrusion radius $r_4$ that transitions from the relief surface 118, a first protrusion face 146 that extends from the first protrusion radius $r_4$, an apex 150 that extends from the first protrusion face 146 and has a second protrusion radius $r_5$, and a second protrusion face 154 extending from the apex 150 to the gullet surface 138. In the illustrated embodiment, the apex 150 of each protrusion 130 is curved such that the protrusions 130 are generally rounded. In other embodiments, the protrusions 130 may have other shapes or forms. The second protrusion face 154 is disposed at an internal protrusion angle D relative to the first protrusion face 146 and is disposed at a rear protrusion angle E relative to the plane 134. In the illustrated embodiment, the first protrusion radius $r_4$ is approximately 0.012 inches, the second protrusion radius $r_5$ is approximately 0.010 inches, the internal protrusion angle D is approximately 70 degrees, and the rear protrusion angle E is approximately 80 degrees.

With continued reference to FIG. 3, the protrusion 130 of each cutting tooth 50 is spaced a first distance N, measured generally parallel to the longitudinal axis 94, from the tip 106 of the corresponding cutting tooth 50. The protrusion 130 of each cutting tooth 50 is spaced a second distance O, measured generally parallel to the longitudinal axis 94, from the tip 106 of an adjacent cutting tooth 50. The second distance O also represents a width of the gullet 114. In some embodiments, a ratio between the first distance N and the second distance O is approximately 1.5. In the illustrated embodiment, the first distance N is approximately 0.12 inches and the second distance O is approximately 0.08 inches.

The apex 150 of the protrusion 130 is spaced a distance Q, measured generally perpendicular to the longitudinal axis 94, from the base 142 of the gullet 114. In some embodiments, a ratio between the distance Q from the base 142 of the gullet 114 to the apex 150 of the protrusion 130 and the distance L from the base 142 of the gullet 114 to the tip 106 of the cutting tooth 50 is approximately 0.68. In the illustrated embodiment, the distance Q is approximately 0.068 inches.

The protrusions 130 of the cutting teeth 50 define a plane 158 that is generally parallel to the longitudinal axis 94 and to the plane 134 defined by the tips 106 of the cutting teeth 50. In some embodiments, a distance R between the plane 134 defined by the tips 106 and the plane 158 defined by the protrusions 130 is at most approximately 0.035 inches. In the illustrated embodiment, the distance R is approximately 0.032 inches. Such an arrangement helps inhibit nails from entering the gullets 114 of the cutting teeth 50 during cutting operations, as further discussed below.

Each cutting tooth 50 also defines an effective relief surface 162 that extends from the tip 106 of the cutting tooth 50 and is tangent to the adjacent/respective protrusion 130. Each effective relief surface 162 intersects the plane 134 defined by the tips 106 at an effective relief angle F. In the illustrated embodiment, the effective relief angle F is approximately 14.5 degrees. The effective relief angle F is between the tang angle A and the relief angle C. That is, the effective relief angle F of each cutting tooth 50 is generally greater than the tang angle A (e.g., 6.5 degrees), but generally smaller than the relief angle C (e.g., 23 degrees). In some embodiments, a ratio between the relief angle C and the effective relief angle F of each cutting tooth 50 is approximately 1.6.

The effective relief surfaces 162 of adjacent cutting teeth 50 are spaced apart from each other by a distance S. In some embodiments, the distance S between effective relief surfaces 162 is at most approximately 0.06 inches. In the illustrated embodiment, the distance S is approximately 0.05 inches. Such an arrangement also helps inhibit nails from entering the gullets 114 of the cutting teeth 50 during cutting operations, as further discussed below. In some embodiments, a ratio between the effective relief angle F, in degrees, of each cutting tooth 50 and the distance S, in inches, between effective relief surfaces 162 is approximately 290. Furthermore, in some embodiments, a ratio between the distance O from the protrusion 130 of one cutting tooth 50 to the tip 106 of an adjacent cutting tooth 50 and the distance S between effective relief surfaces 162 of adjacent cutting teeth 50 is approximately 1.6.

Figure 4:
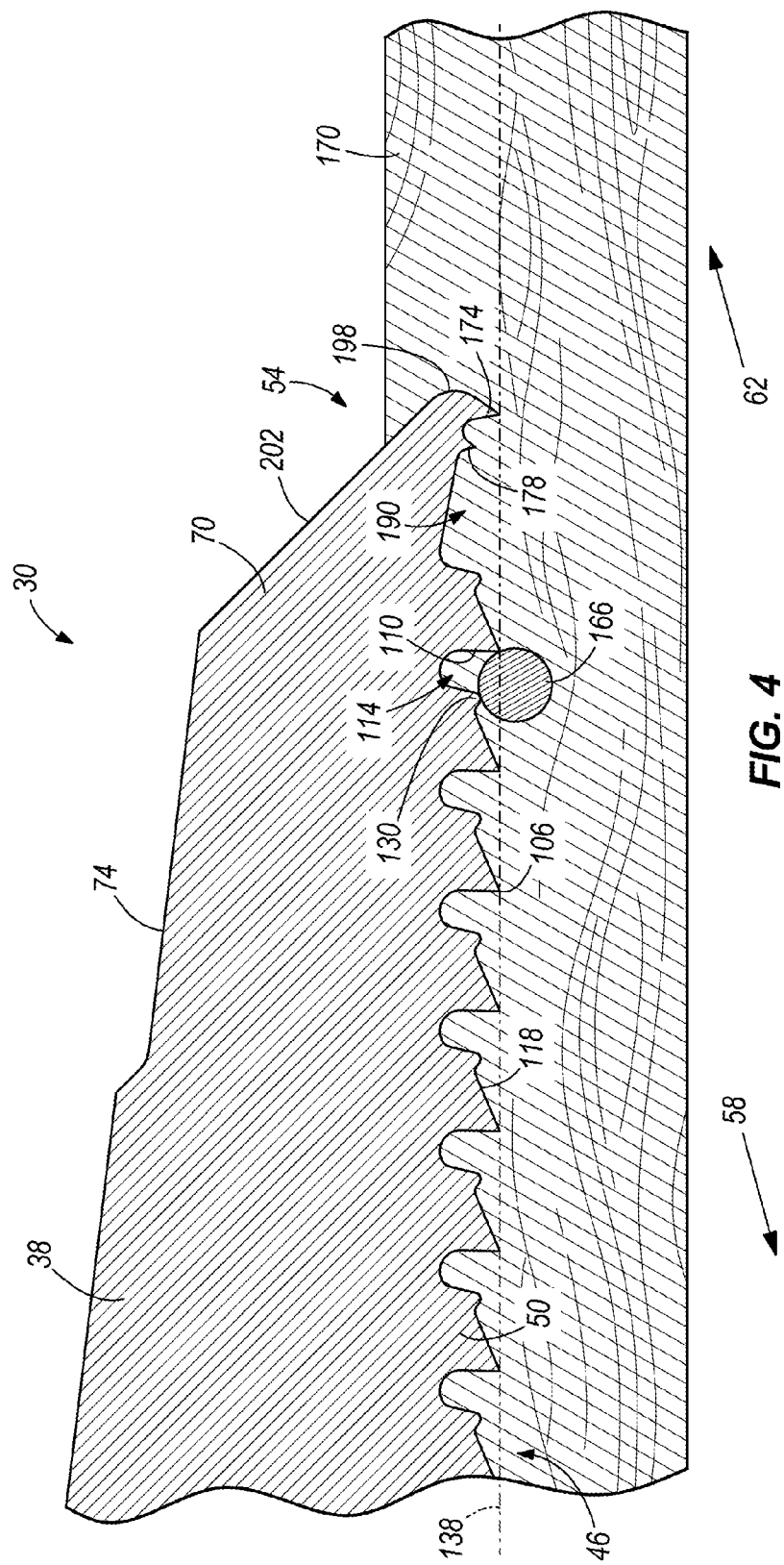
FIG. 4 is an enlarged side view of the portion of the saw blade shown in FIG. 4, the saw blade cutting through a work piece having a nail extending therethrough.

Referring to FIG. 4, the protrusions 130 of the cutting teeth 50 inhibit nails 166, or other hard objects, imbedded in a work piece 170 from entering the gullets 114 and contacting the rake faces 110 of the teeth 50 during cutting operations. As the saw blade 30 moves in the cutting direction 58 (to the left in FIG. 4), the tips 106 of the cutting teeth 50 engage and cut through the work piece 170. The protrusions 130 are hidden behind the tips 106 of adjacent teeth 50 such that the protrusions 130 do not cut the work piece 170 during the cutting operation.

When the saw blade 30 encounters the nail 166, the rake faces 110 of the cutting teeth 50 typically would contact the nail 166. Such contact may chip, break, or otherwise damage the cutting teeth 50, significantly reducing the usable life of the saw blade 30. However, as shown in FIG. 4, the protrusions 130 inhibit the nail 166 from impacting the rake faces 110. Instead, as the saw blade 30 moves in the cutting direction 58, the nail 166 contacts one of the protrusions 130 before contacting the adjacent rake face 110. The protrusion 130 displaces (e.g., lifts) the saw blade 30, which repositions the nail 166 with respect to the gullet 114 in an improved cutting position. In the improved cutting position, the protrusion 130 inhibits the nail 166 from entering the gullet 114 and the tip 106 is allowed to cut into the nail 166. When the saw blade 30 is reciprocated in the return direction 62 (to the right in FIG. 4), the nail 166 can ride along the corresponding relief surface 118 and over the tip 106.

In the illustrated embodiment, the protrusions 130 of the cutting teeth 50 are designed to inhibit a standard framing nail having a 0.131 inch diameter from entering the gullets 114. In other embodiments, the protrusions 130 may be optimized to inhibit other size nails from entering the gullets 114. The distance R between the plane 134 defined by the tips 106 and the plane 158 defined by the protrusions 130 and the distance S between effective relief surfaces 162 of adjacent cutting teeth 50 are optimized to increase durability of the cutting teeth 50 by offsetting a center of the framing nail approximately 0.031 inches below the plane 134. That is, the protrusions 130 are sized and positioned to prevent approximately 80% of the nail from entering the area above the plane 134. Such a configuration results in an increase in durability compared to a similar saw blade without protrusions on the cutting teeth. As used herein, the term 'durability' refers to the average number of cuts a saw blade makes before fracturing a cutting tooth.

Referring back to FIG. 3, the plunge point 54 is formed on the second end portion 70 of the body 38 opposite the attachment portion 42. The illustrated plunge point 54 includes a leading tooth 174 and a second tooth 178. The leading tooth 174 includes a tip 182, a rake face 186 extending from the tip 182 generally toward the longitudinal axis 94 and at least partially defining a leading gullet 190, and a relief surface 194 extending from the tip 182 to an end 198 of the body 38. In the illustrated embodiment, the end 198 of the body 38 is generally rounded. In other embodiments, the end 198 of the body 38 may be, for example, a sharp point or a flat edge. A top edge 202 extends from the end 198 to the back portion 74 of the body 38. The top edge 202 is oriented at an angle G relative to the back portion 74 (e.g., relative to the fourth stepped surface 90). In the some embodiments, the angle G may be approximately 5 to 50 degrees. In the illustrated embodiment, the angle G is approximately 40 degrees.

The tip 182 of the leading tooth 174 extends to the plane 134 defined by the tips 106 of the cutting teeth 50 to help define the plane 134. The rake face 186 extends from the tip 182 at a leading rake angle H relative to the plane 134. The leading rake angle H, measured through the leading tooth 174, is a negative rake angle (i.e., greater than 90 degrees) such that the leading tooth 174 is a negative rake tooth. A negative rake tooth is less likely to hook or grab material being cut, allowing the plunge point 54 to more easily penetrate a work piece without chipping the work piece. In the illustrated embodiment, the leading rake angle H is approximately 95 to 105 degrees. In other embodiments, the leading rake angle H may be larger or smaller, or the rake face 186 may extend at a positive rake angle relative to the plane 134.

The relief surface 194 of the leading tooth 174 extends from the tip 182 at a leading relief angle I relative to the plane 134. In some embodiments, the leading relief angle I is less than 90 degrees. In other embodiments, the leading relief angle I is greater than 45 degrees. In the illustrated embodiment, the leading relief angle I is approximately 55 to 65 degrees.

The leading gullet 190 is defined by the rake face 186 of the leading tooth 174 and extends to the nearest, or first, cutting tooth 50. As shown in FIG. 3, the leading gullet 190 is significantly larger than the gullets 114 of the cutting teeth 50 and has a leading gullet width T. In some embodiments, the leading gullet 174 is at least twice as large as each gullet 114. In the illustrated embodiment, the leading gullet 174 is approximately four times larger than each gullet 114. As such, the leading tooth 174 is spaced further apart from the nearest cutting tooth 50 than the cutting teeth 50 are spaced apart from each other. In the illustrated embodiment, a ratio between a distance U from the tip 182 of the leading tooth 174 to the tip 106 of the nearest cutting tooth 50, measured generally parallel to the longitudinal axis 94, and the distance P between the tips 106 of adjacent cutting teeth 50 (i.e., the tooth pitch) is approximately 2.0. The enlarged leading gullet 190 improves plunge cut performance by allowing the leading tooth 174 to penetrate further into a work piece before the plurality of cutting teeth 50 engage the work piece, thereby improving cut quality and finish. The enlarged leading gullet 190 also improves cut speed by allowing for greater chip removal.

The illustrated second tooth 178 is generally V-shaped and includes a tip 206, a rake face 210 extending from the tip 206 generally toward the longitudinal axis 94, and a relief surface 214 extending from the tip 206 generally toward the leading tooth 174. Similar to the leading tooth 174, the rake face 210 of the second tooth 178 extends at a negative rake angle J (i.e., at an angle greater than 90 degrees) relative to the plane 134. In the illustrated embodiment, the rake angle J, measured through the second tooth, is approximately 95 to 105 degrees. In other embodiments, the rake angle J may be larger or smaller, or the rake face 210 may extend at a positive rake angle relative to the plane 134.

The second tooth 178 is positioned within the leading gullet 190 adjacent the leading tooth 174 such that the second tooth 178 is closer to the leading tooth 174 than to the nearest cutting tooth 50. In the illustrated embodiment, the tip 206 of the second tooth 178 is spaced a distance V, measured generally parallel to the longitudinal axis 94, from the tip 182 of the leading tooth 174. A ratio between the distance V from the tip 182 of the leading tooth 174 to the tip 206 of the second tooth 178 and the distance P between the tips 106 of adjacent cutting teeth 50 (i.e., the tooth pitch) is approximately 0.3. In addition, a ratio between the distance U from the tip 182 of the leading tooth 174 to the tip 106 of the nearest cutting tooth 50 and the distance V from the tip 182 of the leading tooth 174 to the tip 206 of the second tooth 178 is approximately 6.6. In other embodiments, these ratios may be relatively larger or smaller.

The illustrated second tooth 178 is generally smaller than the leading tooth 174 and each of the cutting teeth 50. As shown in FIG. 3, the second tooth 178 extends from the leading gullet 190 and is spaced apart from the plane 134 defined by the tips 106 of the cutting teeth 50. In other words, the plane 134 does not intersect or extend through any portion of the second tooth 178. In the illustrated embodiment, the second tooth 178 extends less than halfway from the body 38 to the plane 134. In other embodiments, the second tooth 178 may extend to a position nearer the plane 134 such as, for example, three-quarters the distance to the plane 134.

In addition, the second tooth 178 has an utmost width W that is less than an utmost width X of the leading tooth 174 and an utmost width Y of each cutting tooth 50. As used herein, the term 'utmost width' refers to a measurement of a tooth that is taken generally parallel to the longitudinal axis 94 at the tooth's greatest or maximum dimension. In the illustrated embodiment, the utmost width X of the leading tooth 174 is also less than the utmost width Y of each cutting tooth 50. In other embodiments, the utmost width X of the leading tooth 174 may be the same or similar to the utmost width Y of each cutting tooth 50.

The second tooth 178 improves plunge cut performance by breaking up chip material, thereby reducing the load on the leading tooth 174 and facilitating chip removal. Such an arrangement also increases cutting speed and saw blade life. In the illustrated embodiment, the plunge point 54 includes a single second tooth 178 positioned within the leading gullet 190. In other embodiments, the plunge point 54 may include multiple second teeth positioned within the leading gullet 190. In such embodiments, one or more of the second teeth may be set. Additionally or alternatively, the second teeth may have different geometries and/or sizes. In still other embodiments, the second tooth 178 may be omitted from the plunge point 54.

Figure 5:
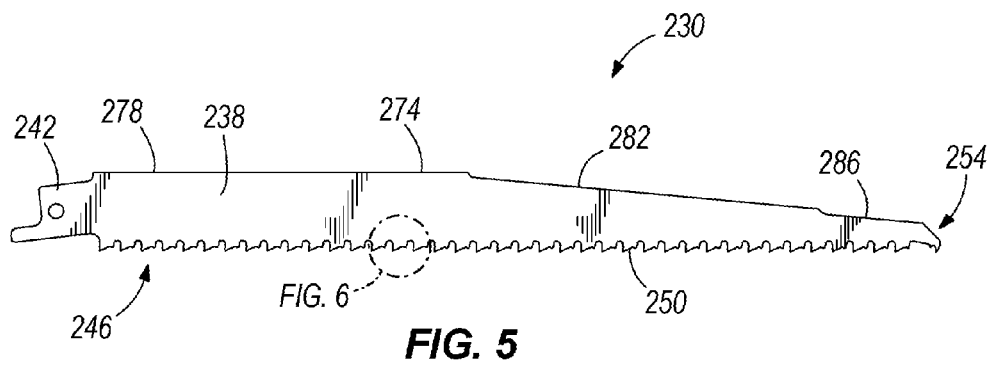
FIG. 5 is a side view of a saw blade according to another embodiment of the invention.
Figure 6:
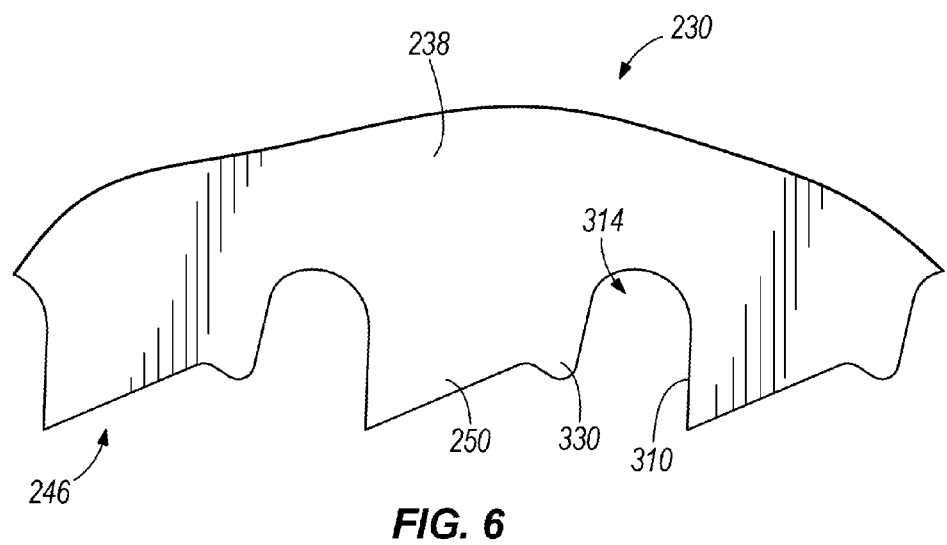
FIG. 6 is an enlarged side view of a portion of the saw blade shown in FIG. 5.

FIGS. 5-6 illustrate a reciprocating saw blade 230 according to another embodiment of the invention. The illustrated saw blade 230 is similar to the saw blade 30 described above with reference to FIGS. 1-4, and similar parts have been given the same reference numbers, plus 200.

The illustrated saw blade 230 includes a body 238, an attachment portion 242 for coupling the blade 230 to a reciprocating saw, a cutting portion 246 having a plurality of cutting teeth 250, and a plunge point 254 for initiating a plunge cut. Each of the cutting teeth 250 includes a protrusion 330 that inhibits a nail from entering a gullet 314 and contacting a rake face 310 of an adjacent cutting tooth 250. In the illustrated embodiment, a back portion 274 of the body 238 is formed with three stepped surfaces 278, 282, 286, rather than the four stepped surfaces 78, 82, 86, 90 shown in FIGS. 1-2.

Figure 7:
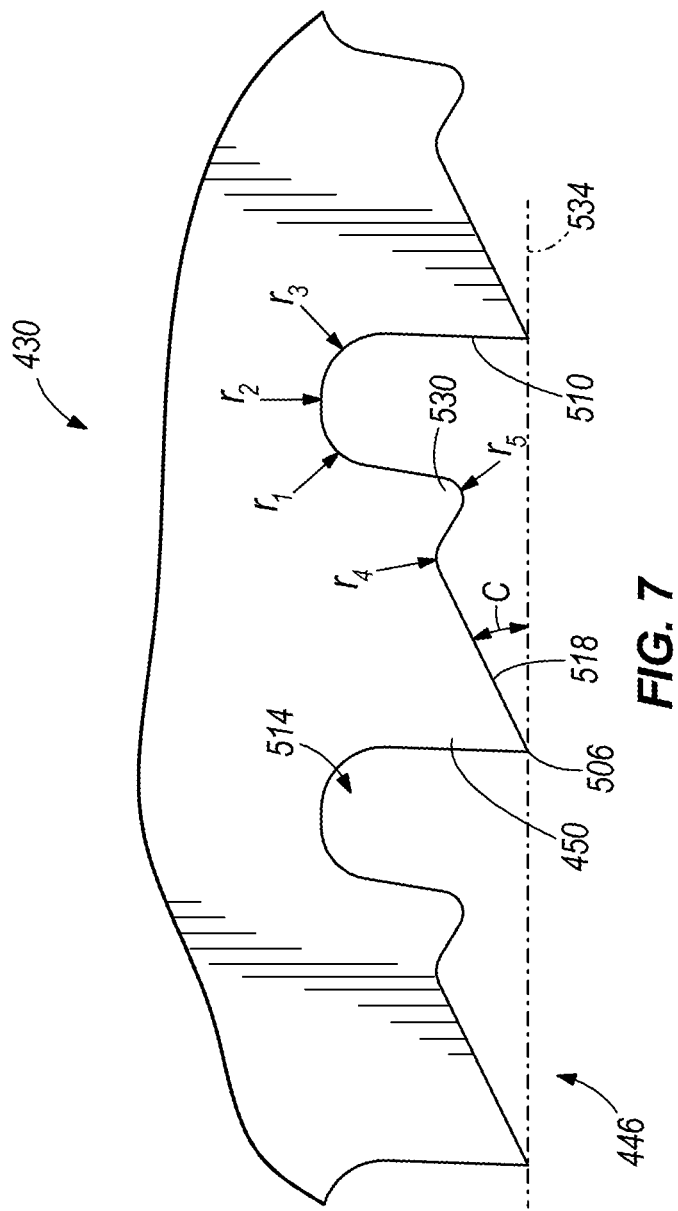
FIG. 7 is an enlarged side view of a portion of a saw blade according to yet another embodiment of the invention.

FIG. 7 illustrates a cutting portion 446 of a saw blade 430 according to another embodiment of the invention. The illustrated saw blade 430 is similar to the saw blade 30 described above with reference to FIGS. 1-4, and similar parts have been given the same reference numbers plus 400.

The cutting portion 446 includes a plurality of cutting teeth 450. Each cutting tooth 450 includes a protrusion 530 that inhibits a nail from entering a gullet 514 and contacting a rake face 510 of an adjacent cutting tooth 450. Similar to the gullets 114 and the protrusions 130 discussed above with reference to FIGS. 1-4, each of the gullets 514 is defined by three gullet radii $r_1$, $r_2$, $r_3$ and each of the protrusions 130 is defined by two protrusion radii $r_4$, $r_5$. In the illustrated embodiment, the first gullet radius $r_1$ is approximately 0.021 inches, the second gullet radius $r_2$ is approximately 0.035 inches, the third gullet radius $r_3$ is approximately 0.040, the first protrusion radius $r_4$ is approximately 0.012 inches, and the second protrusion radius $r_5$ is approximately 0.010 inches.

In addition, each cutting tooth 450 includes a relief surface 518 extending from a tip 506 of the tooth 450. The relief surfaces 518 are oriented at a relief angle C relative to a plane 534 defined by the tips 506 of the cutting teeth 450. In the illustrated embodiment, the relief angle C of each cutting tooth 450 is approximately 26 degrees.

Figure 8:
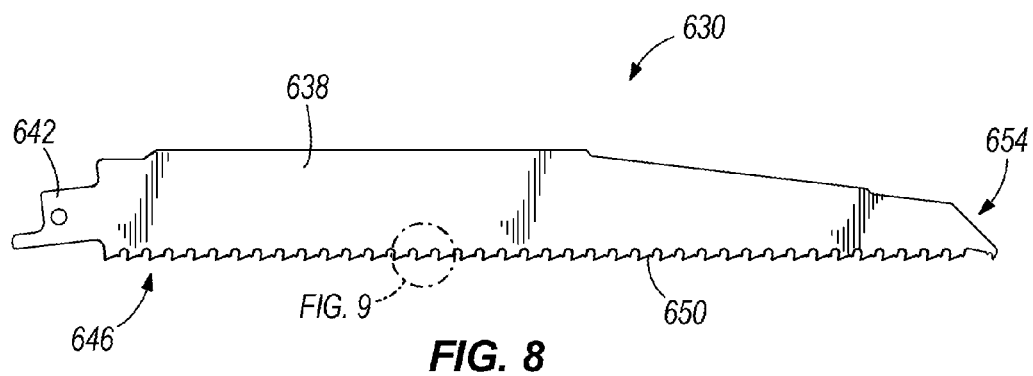
FIG. 8 is a side view of a saw blade according to another embodiment of the invention.
Figure 9:
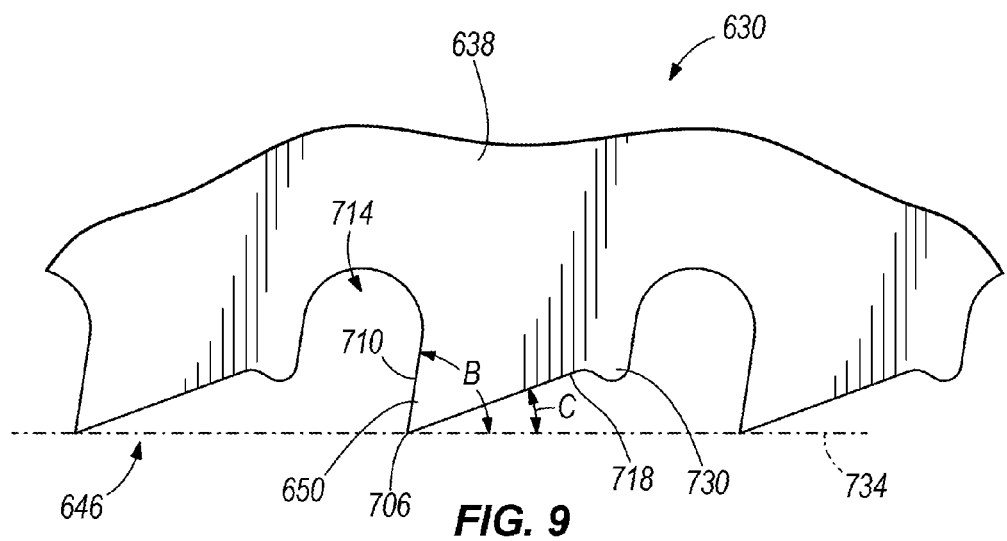
FIG. 9 is an enlarged side view of a portion of the saw blade shown in FIG. 8.

FIGS. 8-9 illustrate a reciprocating saw blade 630 according to another embodiment of the invention. The illustrated saw blade 630 is similar to the saw blade 30 described above with reference to FIGS. 1-4, and similar parts have been given the same reference numbers, plus 600.

The illustrated saw blade 630 includes a body 638, an attachment portion 642 for coupling the blade 630 to a reciprocating saw, a cutting portion 646 having a plurality of cutting teeth 650, and a plunge point 654 for initiating a plunge cut. Each of the cutting teeth 650 includes a tip 706, a rake face 710 at least partially defining a gullet 714, a relief surface 718, and a protrusion 730. The protrusions 730 inhibit nails from entering the gullets 714 and contacting the rake faces 710 of adjacent cutting teeth 650. Each rake face 710 extends from the tip 706 at a rake angle B relative to a plane 734 defined by the tips 706. In the illustrated embodiment, the rake angle B of each cutting tooth 650 is approximately 82 degrees. Each relief surface 718 also extends from the tip 706 at a relief angle C relative to the plane 734. In the illustrated embodiment, the relief angle C of each cutting tooth 650 is approximately 20 degrees.

Figure 10:
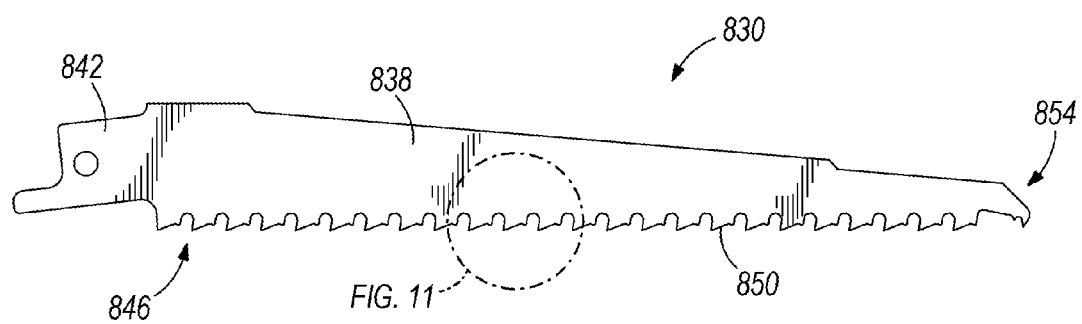
FIG. 10 is a side view of a saw blade according to another embodiment of the invention.
Figure 11:
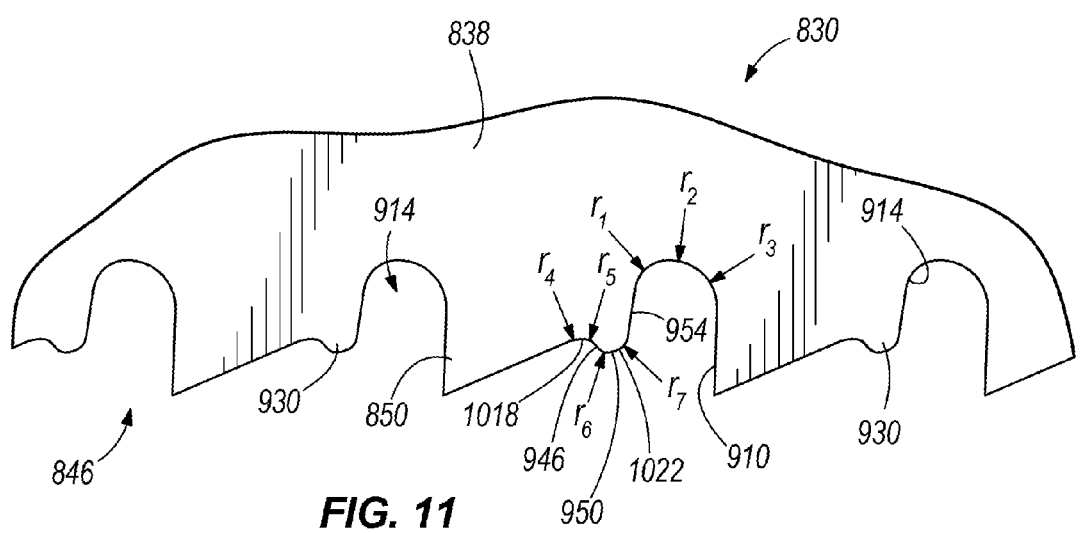
FIG. 11 is an enlarged side view of a portion of the saw blade shown in FIG. 10.

FIGS. 10-11 illustrate a reciprocating saw blade 830 according to another embodiment of the invention. The illustrated saw blade 830 is similar to the saw blade 30 described above with reference to FIGS. 1-4, and similar parts have been given the same reference numbers, plus 800.

The illustrated saw blade 830 includes a body 838, an attachment portion 842 for coupling the blade 830 to a reciprocating saw, a cutting portion 846 having a plurality of cutting teeth 850, and a plunge point 854 for initiating a plunge cut. Each of the cutting teeth 850 includes a protrusion 930 that inhibits a nail from entering a gullet 914 and contacting a rake face 910 of an adjacent cutting tooth 850. Similar to the gullets 914 discussed above with reference to FIGS. 1-4, each of the gullets 914 is defined by three gullet radii $r_1$, $r_2$, $r_3$. In the illustrated embodiment, the first gullet radius $r_1$ is approximately 0.025 inches, the second gullet radius $r_2$ is approximately 0.035 inches, and the third gullet radius $r_3$ is approximately 0.040 inches.

Each of the illustrated protrusions 930 is defined by a first protrusion radius $r_4$, a second protrusion radius $r_5$, and a first intermediate surface 1018 extending between the radii $r_4$, $r_5$. The first intermediate surface 1018 is a generally planar surface. In the illustrated embodiment, the first protrusion radius $r_4$ is approximately 0.010 inches, the second protrusion radius $r_5$ is approximately 0.010 inches, and the length of the first intermediate surface 1018 is approximately 0.005 inches. Each of the protrusions 930 is also defined by a first protrusion face 946 that extends from the second protrusion radius $r_5$, an apex 950 that extends from the first protrusion face 946, and a second protrusion face 954 that extends from the apex 950 and defines the gullet 914. The apex 950 is further defined by a third protrusion radius $r_6$, a fourth protrusion radius $r_7$, and a second intermediate surface 1022 extending between the radii $r_6$, $r_7$. The second intermediate surface 1022 is a generally planar surface. In the illustrated embodiment, the third protrusion radius $r_6$ is approximately 0.010 inches, the fourth protrusion radius $r_7$ is approximately 0.010 inches, and the length of the second intermediate surface 1022 is approximately 0.005 inches.

Figure 12:
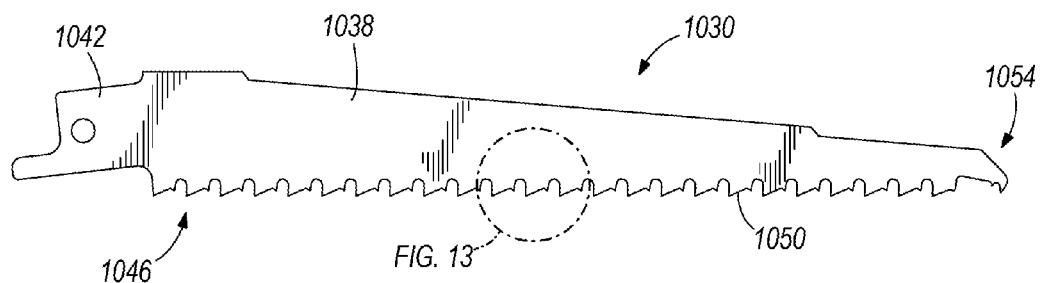
FIG. 12 is a side view of a saw blade according to another embodiment of the invention.
Figure 13:
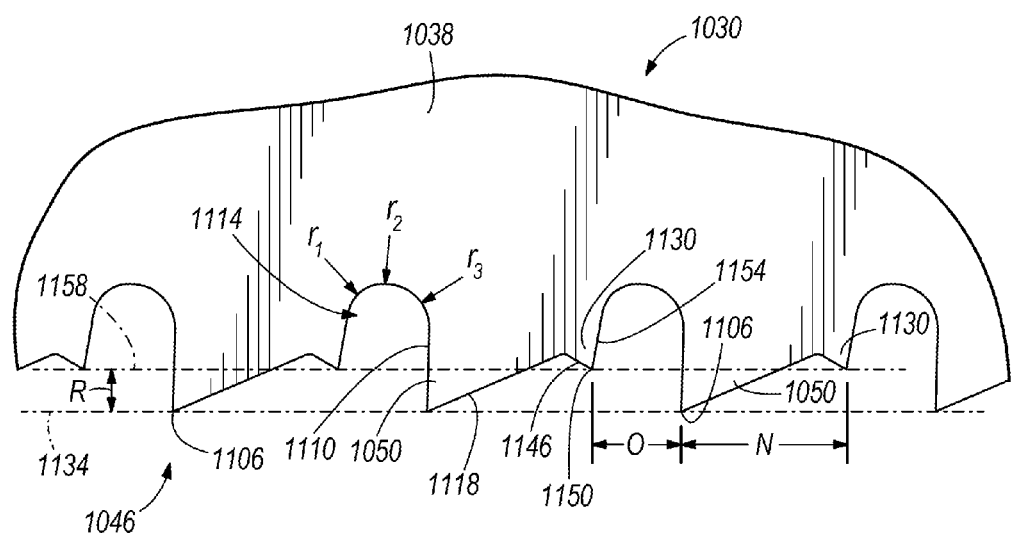
FIG. 13 is an enlarged side view of a portion of the saw blade shown in FIG. 12.

FIGS. 12-13 illustrate a reciprocating saw blade 1030 according to another embodiment of the invention. The illustrated saw blade 1030 is similar to the saw blade 30 described above with reference to FIGS. 1-4, and similar parts have been given the same reference numbers, plus 1000.

The illustrated saw blade 1030 includes a body 1038, an attachment portion 1042 for coupling the blade 1030 to a reciprocating saw, a cutting portion 1046 having a plurality of cutting teeth 1050, and a plunge point 1054 for initiating a plunge cut. Each of the cutting teeth 1050 includes a protrusion 1130 that inhibits a nail from entering a gullet 1114 and contacting a rake face 1110 of an adjacent cutting tooth 1050. Similar to the gullets 1114 discussed above with reference to FIGS. 1-4, each of the gullets 1114 is defined by three gullet radii $r_1$, $r_2$, $r_3$. In the illustrated embodiment, the first gullet radius $r_1$ is approximately 0.030 inches, the second gullet radius $r_2$ is approximately 0.035 inches, and the third gullet radius $r_3$ is approximately 0.040 inches.

Each of the illustrated protrusions 1130 is defined by a first protrusion face 1146 extending from a relief surface 1118, an apex 1150, and a second protrusion face 1154 that extends from the apex 1150 and defines the gullet 1114. In the illustrated embodiment, the apex 1150 is a pointed tip such that each protrusion 1130 is generally pointed, rather than rounded. The apexes 1150 define a plane 1158 that is spaced apart a distance R from a plane 1134 defined by tips 1106 of the cutting teeth 1050. In the illustrated embodiment, the distance R is approximately 0.034 inches. Furthermore, each apex 1150 is spaced apart a distance O from the tip 1106 of an adjacent cutting tooth 1050. In the illustrated embodiment, the distance O is approximately 0.07 inches. In such embodiments, a ratio between a distance N from the protrusion 1130 to the tip 1106 of one cutting tooth 1050 and the distance O is approximately 1.9. In other embodiments, the distances R, O may be relatively larger or smaller, such as, for example, 0.032 inches and 0.08 inches, respectively.

Figure 14:
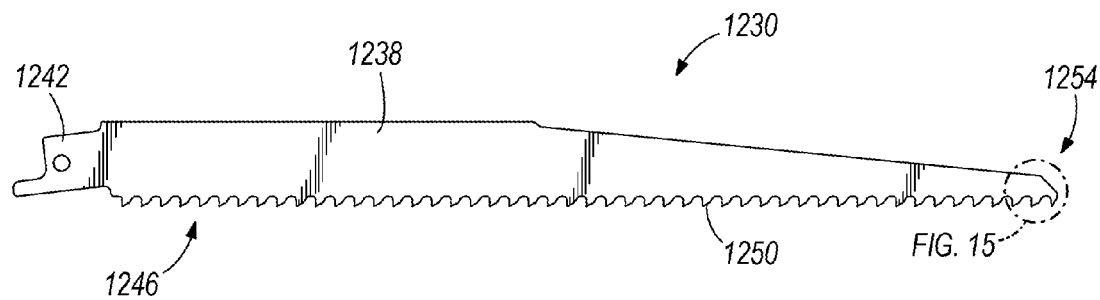
FIG. 14 is a side view of a saw blade according to another embodiment of the invention.
Figure 15:
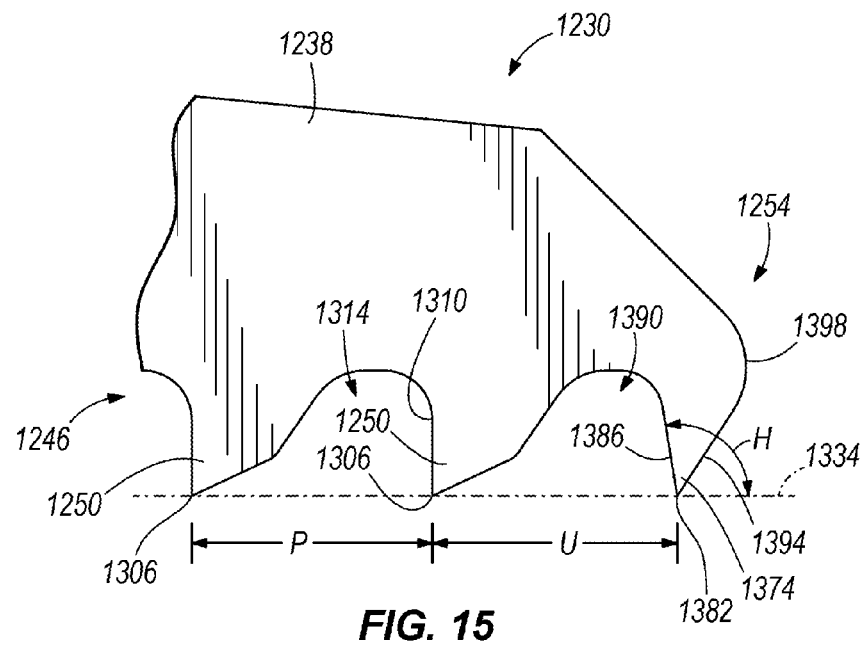
FIG. 15 is an enlarged side view of a portion of the saw blade shown in FIG. 14.

FIGS. 14-15 illustrate a reciprocating saw blade 1230 according to another embodiment of the invention. The illustrated saw blade 1230 is similar to the saw blade 30 described above with reference to FIGS. 1-4, and similar parts have been given the same reference numbers, plus 1200.

The illustrated saw blade 1230 includes a body 1238, an attachment portion 1242 for coupling the blade 1230 to a reciprocating saw, a cutting portion 1246 having a plurality of cutting teeth 1250, and a plunge point 1254 for initiating a plunge cut. In the illustrated embodiment, the plunge point 1254 includes a leading tooth 1374, but not a second tooth. The leading tooth 1374 includes a tip 1382, a rake face 1386 extending from the tip 1382 and at least partially defining a leading gullet 1390, and a relief surface 1394 extending from the tip 1382 to an end 1398 of the body 1238. The rake face 1386 extends from the tip 1382 at a leading rake angle H relative to a plane 1334 defined by tips 1306 of the cutting teeth 1250. The leading rake angle H, measured through the leading tooth 1374, is a negative rake angle such that the leading tooth 1374 is a negative rake tooth. In the illustrated embodiment, the leading rake angle H is approximately 95 to 105 degrees.

As shown in FIG. 15, the tip 1382 of the leading tooth 1374 is spaced a distance U from the tip 1306 of the nearest cutting tooth 1250. In the illustrated embodiment, the distance U is generally the same as a distance P (i.e., the pitch) between the tips 1306 of adjacent cutting teeth 1250. As such, the leading gullet 1390 is generally the same size as gullets 1314 defined by the plurality of cutting teeth 1250.

Although not shown, in some embodiments, each of the cutting teeth 1250 may include a protrusion that inhibits a nail from entering the gullet 1314 and contacting a rake face 1310 of an adjacent cutting tooth 1250.

Figure 16:
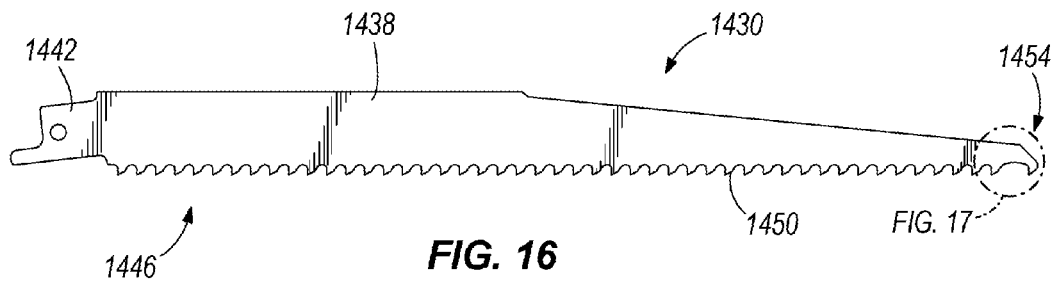
FIG. 16 is a side view of a saw blade according to another embodiment of the invention.
Figure 17:
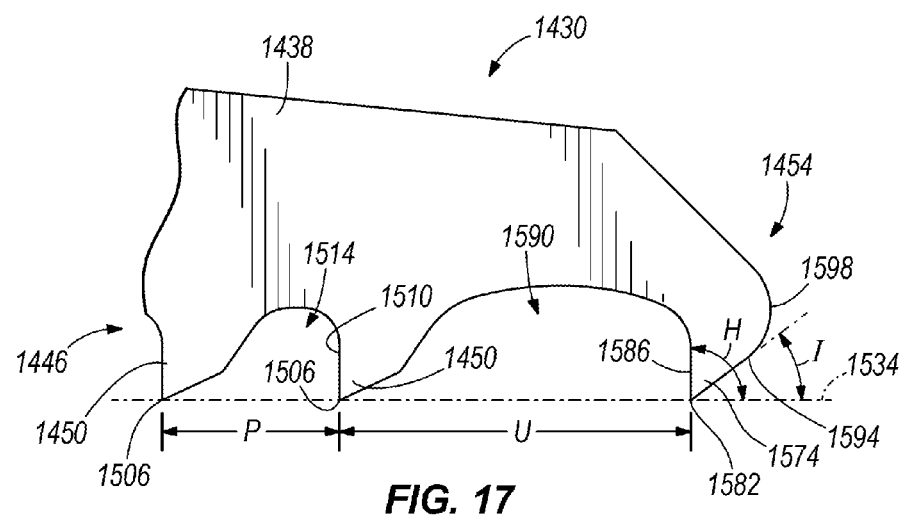
FIG. 17 is an enlarged side view of a portion of the saw blade shown in FIG. 16.

FIGS. 16-17 illustrate a reciprocating saw blade 1430 according to another embodiment of the invention. The illustrated saw blade 1430 is similar to the saw blade 30 described above with reference to FIGS. 1-4, and similar parts have been given the same reference numbers, plus 1400.

The illustrated saw blade 1430 includes a body 1438, an attachment portion 1442 for coupling the blade 1430 to a reciprocating saw, a cutting portion 1446 having a plurality of cutting teeth 1450, and a plunge point 1454 for initiating a plunge cut. In the illustrated embodiment, the plunge point 1454 includes a leading tooth 1574, but not a second tooth. The leading tooth 1574 includes a tip 1582, a rake face 1586 extending from the tip 1582 and at least partially defining a leading gullet 1590, and a relief surface 1594 extending from the tip 1582 to an end 1598 of the body 1438. The rake face 1586 extends from the tip 1582 at a leading rake angle H relative to a plane 1534 defined by tips 1506 of the cutting teeth 1450. The leading rake angle H, measured through the leading tooth 1574, is a positive rake angle such that the leading tooth 1574 is a positive rake tooth having substantially the same rake angle as each of the cutting teeth 1450. In the illustrated embodiment, the leading rake angle H is approximately 80 to 88 degrees.

The relief surface 1594 of the leading tooth 1574 extends from the tip 1582 at a leading relief angle I relative to the plane 1534. In the illustrated embodiment, the leading relief angle I is approximately 25 to 45 degrees.

As shown in FIG. 17, the tip 1582 of the leading tooth 1574 is spaced a distance U from the tip 1506 of the nearest cutting tooth 1450. The distance U is generally greater than a distance P (i.e., the pitch) between the tips 1506 of adjacent cutting teeth 1450. In the illustrated embodiment, the distance U is approximately twice the distance P. As such, the leading gullet 1590 is substantially larger than each gullet 1514 of the cutting teeth 1450.

Although not shown, in some embodiments, each of the cutting teeth 1450 may include a protrusion that inhibits a nail from entering the gullet 1514 and contacting a rake face 1510 of an adjacent cutting tooth 1450.

Figure 18:
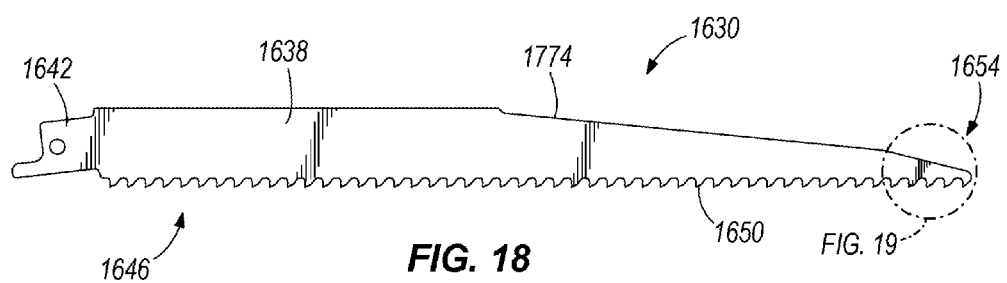
FIG. 18 is a side view of a saw blade according to another embodiment of the invention.
Figure 19:
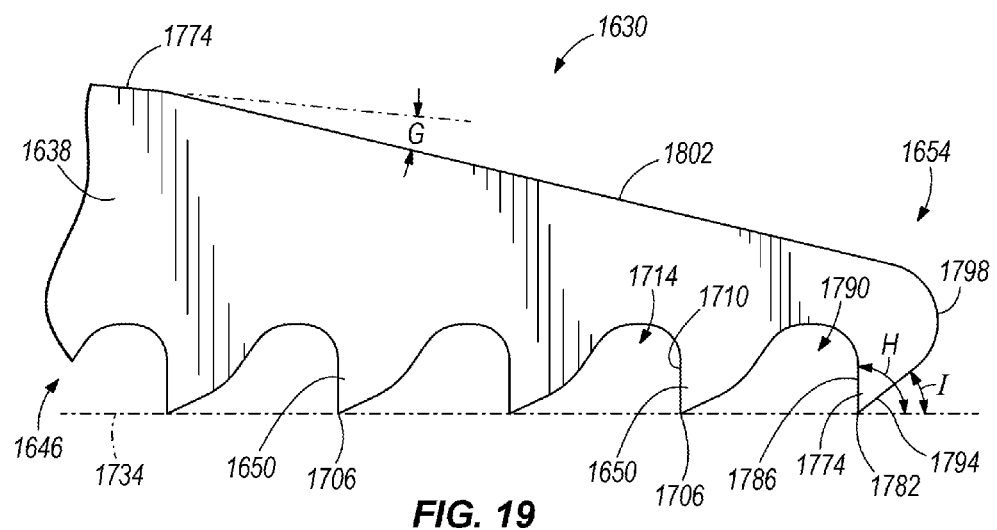
FIG. 19 is an enlarged side view of a portion of the saw blade shown in FIG. 18.

FIGS. 18-19 illustrate a reciprocating saw blade 1630 according to another embodiment of the invention. The illustrated saw blade 1630 is similar to the saw blade 30 described above with reference to FIGS. 1-4, and similar parts have been given the same reference numbers, plus 1600.

The illustrated saw blade 1630 includes a body 1638, an attachment portion 1642 for coupling the blade 1630 to a reciprocating saw, a cutting portion 1646 having a plurality of cutting teeth 1650, and a plunge point 1654 for initiating a plunge cut. In the illustrated embodiment, the plunge point 1654 includes a leading tooth 1774, but not a second tooth. The leading tooth 1774 includes a tip 1782, a rake face 1786 extending from the tip 1782 and at least partially defining a leading gullet 1790, and a relief surface 1794 extending from the tip 1782 to an end 1798 of the body 1638. The rake face 1786 extends from the tip 1782 at a leading rake angle H relative to a plane 1734 defined by tips 1706 of the cutting teeth 1650. The leading rake angle H, measured through the leading tooth 1774, is a positive rake angle such that the leading tooth 1774 is a positive rake tooth having substantially the same rake angle as each of the cutting teeth 1650. In the illustrated embodiment, the leading rake angle H is approximately 80 to 88 degrees.

The relief surface 1794 of the leading tooth 1774 extends from the tip 1782 at a leading relief angle I relative to the plane 1734. In the illustrated embodiment, the leading relief angle I is approximately 25 to 45 degrees.

As shown in FIG. 19, the plunge point 1654 also includes a top edge 1802 extending from the end 1798 of the body 1638 to a back portion 1774 of the body 1638. The illustrated top edge 1802 is an elongated edge that is oriented at an angle G relative to the back portion 1774 such that the plunge point 1654 is a tapered plunge point. In some embodiments, the angle G is less than 15 degrees. In the illustrated embodiment, the angle G is approximately 8 degrees. The tapered plunge point 1654 improves plunge cut performance by reducing the clearance required for the saw blade 1630 to enter a work piece, thereby increasing cutting speed and improving cut accuracy and finish.

Although not shown, in some embodiments, each of the cutting teeth 1650 may include a protrusion that inhibits a nail from entering a gullet 1714 and contacting a rake face 1710 of an adjacent cutting tooth 1650.

Figure 20:
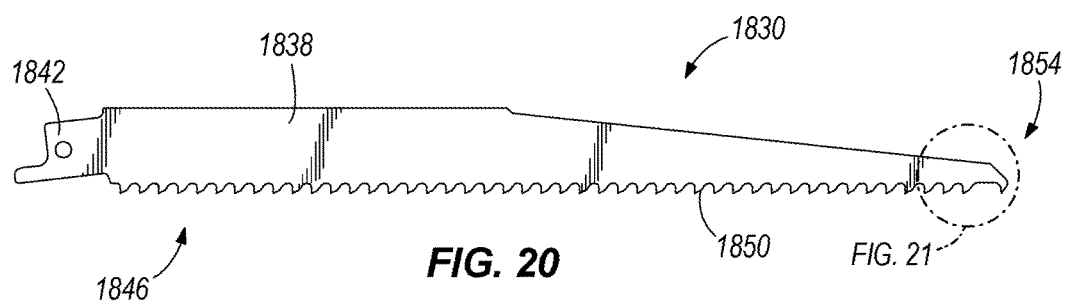
FIG. 20 is a side view of a saw blade according to another embodiment of the invention.
Figure 21:
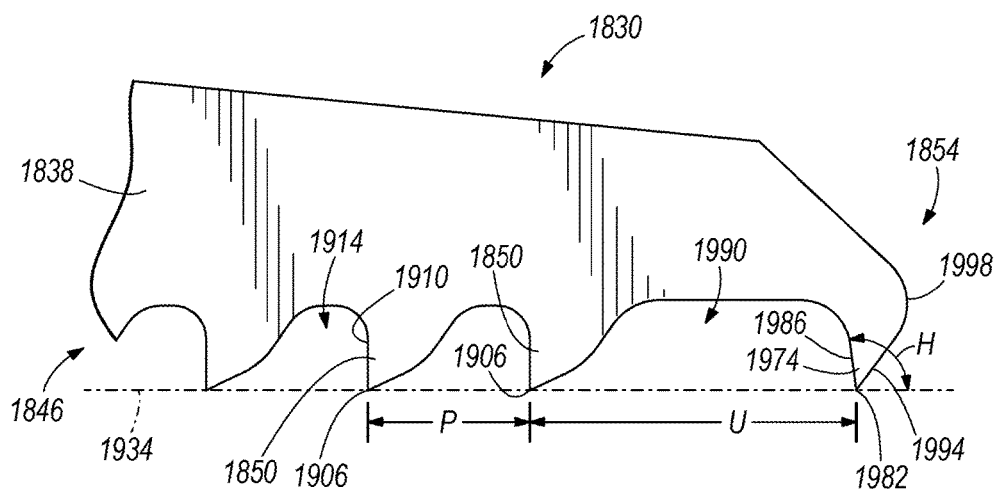
FIG. 21 is an enlarged side view of a portion of the saw blade shown in FIG. 20.

FIGS. 20-21 illustrate a reciprocating saw blade 1830 according to another embodiment of the invention. The illustrated saw blade 1830 is similar to the saw blade 30 described above with reference to FIGS. 1-4, and similar parts have been given the same reference numbers, plus 1800.

The illustrated saw blade 1830 includes a body 1838, an attachment portion 1842 for coupling the blade 1830 to a reciprocating saw, a cutting portion 1846 having a plurality of cutting teeth 1850, and a plunge point 1854 for initiating a plunge cut. In the illustrated embodiment, the plunge point 1854 includes a leading tooth 1974, but not a second tooth. The leading tooth 1974 includes a tip 1982, a rake face 1986 extending from the tip 1982 and at least partially defining a leading gullet 1990, and a relief surface 1994 extending from the tip 1982 to an end 1998 of the body 1838. The rake face 1986 extends from the tip 1982 at a leading rake angle H relative to a plane 1934 defined by tips 1906 of the cutting teeth 1850. The leading rake angle H, measured through the leading tooth 1974, is a negative rake angle such that the leading tooth 1974 is a negative rake tooth. In the illustrated embodiment, the leading rake angle H is approximately 95 to 105 degrees.

As shown in FIG. 21, the tip 1982 of the leading tooth 1974 is spaced a distance U from the tip 1906 of the nearest cutting tooth 1850. The distance U is generally greater than a distance P (i.e., the pitch) between the tips 1906 of adjacent cutting teeth 1850. In the illustrated embodiment, the distance U is approximately twice the distance P. As such, the leading gullet 1990 is substantially larger than each gullet 1914 of the cutting teeth 1850.

Although not shown, in some embodiments, each of the cutting teeth 1850 may include a protrusion that inhibits a nail from entering the gullet 1914 and contacting a rake face 1910 of an adjacent cutting tooth 1850.

Figure 22:
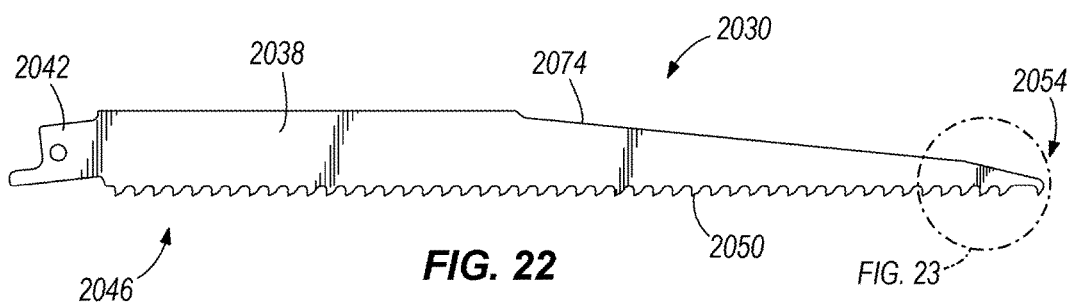
FIG. 22 is a side view of a saw blade according to another embodiment of the invention.
Figure 23:
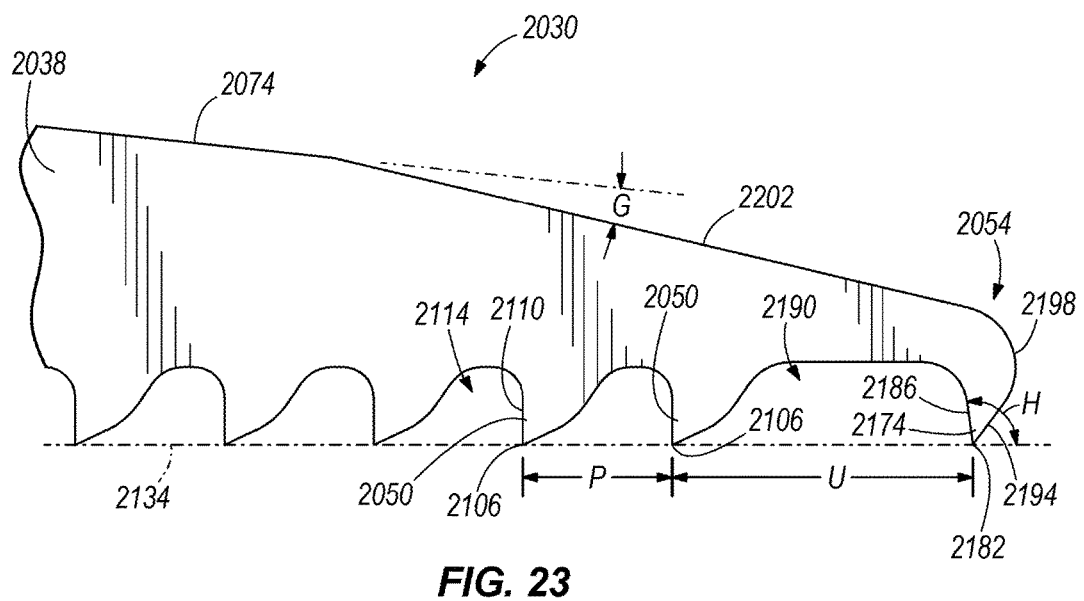
FIG. 23 is an enlarged side view of a portion of the saw blade shown in FIG. 22.

FIGS. 22-23 illustrate a reciprocating saw blade 2030 according to another embodiment of the invention. The illustrated saw blade 2030 is similar to the saw blade 30 described above with reference to FIGS. 1-4, and similar parts have been given the same reference numbers, plus 2000.

The illustrated saw blade 2030 includes a body 2038, an attachment portion 2042 for coupling the blade 2030 to a reciprocating saw, a cutting portion 2046 having a plurality of cutting teeth 2050, and a plunge point 2054 for initiating a plunge cut. In the illustrated embodiment, the plunge point 2054 includes a leading tooth 2174, but not a second tooth. The leading tooth 2174 includes a tip 2182, a rake face 2186 extending from the tip 2182 and at least partially defining a leading gullet 2190, and a relief surface 2194 extending from the tip 2182 to an end 2198 of the body 2038. The rake face 2186 extends from the tip 2182 at a leading rake angle H relative to a plane 2134 defined by tips 2106 of the cutting teeth 2050. The leading rake angle H, measured through the leading tooth 2174, is a negative rake angle such that the leading tooth 2174 is a negative rake tooth. In the illustrated embodiment, the leading rake angle H is approximately 95 to 105 degrees.

As shown in FIG. 23, the tip 2182 of the leading tooth 2174 is spaced a distance U from the tip 2106 of the nearest cutting tooth 2050. The distance U is generally greater than a distance P (i.e., the pitch) between the tips 2106 of adjacent cutting teeth 2050. In the illustrated embodiment, the distance U is approximately twice the distance P. As such, the leading gullet 2190 is substantially larger than each gullet 2114 of the cutting teeth 2050.

The plunge point 2054 also includes a top edge 2202 extending from the end 2198 of the body 2038 to a back portion 2074 of the body 2038. The illustrated top edge 2202 is an elongated edge that is oriented at an angle G relative to the back portion 2074 such that the plunge point 2054 is a tapered plunge point. In some embodiments, the angle G is less than 15 degrees. In the illustrated embodiment, the angle G is approximately 8 degrees.

Although not shown, in some embodiments, each of the cutting teeth 2050 may include a protrusion that inhibits a nail from entering the gullet 2114 and contacting a rake face 2110 of an adjacent cutting tooth 2050.

Figure 24:
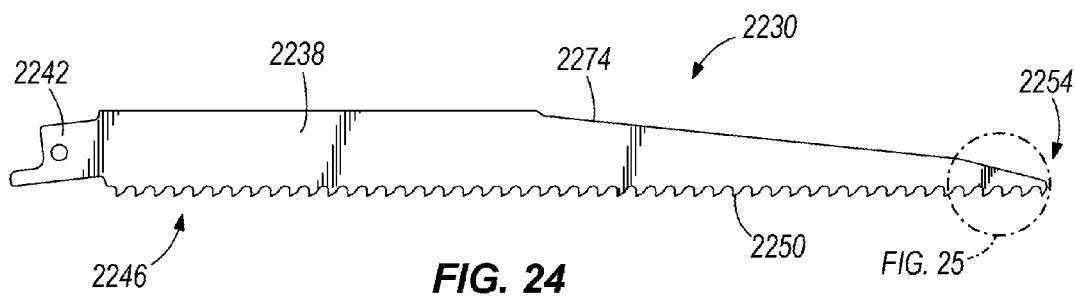
FIG. 24 is a side view of a saw blade according to another embodiment of the invention.
Figure 25:
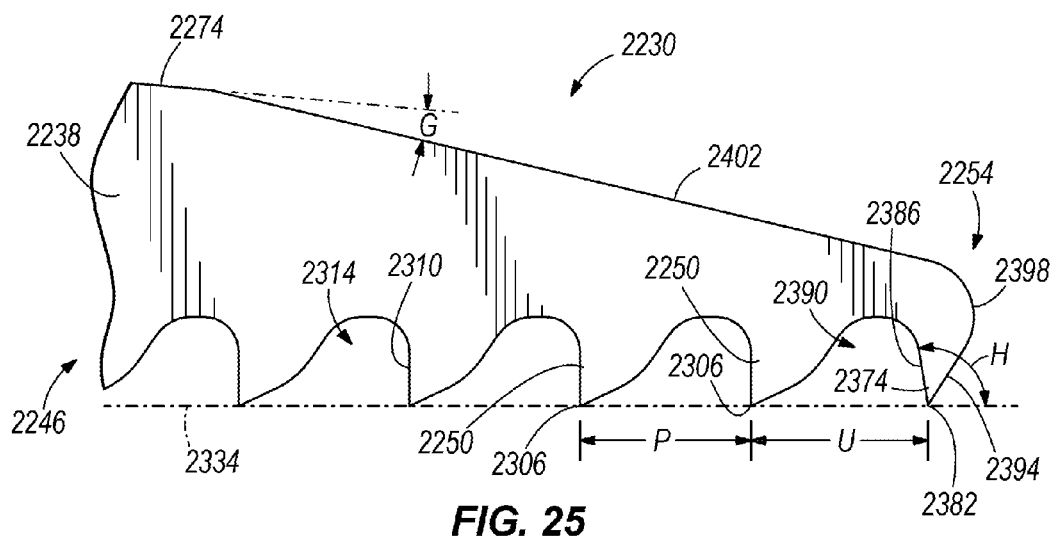
FIG. 25 is an enlarged side view of a portion of the saw blade shown in FIG. 24.

FIGS. 24-25 illustrate a reciprocating saw blade 2230 according to another embodiment of the invention. The illustrated saw blade 2230 is similar to the saw blade 30 described above with reference to FIGS. 1-4, and similar parts have been given the same reference numbers, plus 2200.

The illustrated saw blade 2230 includes a body 2238, an attachment portion 2242 for coupling the blade 2230 to a reciprocating saw, a cutting portion 2246 having a plurality of cutting teeth 2250, and a plunge point 2254 for initiating a plunge cut. In the illustrated embodiment, the plunge point 2254 includes a leading tooth 2374, but not a second tooth. The leading tooth 2374 includes a tip 2382, a rake face 2386 extending from the tip 2382 and at least partially defining a leading gullet 2390, and a relief surface 2394 extending from the tip 2382 to an end 2398 of the body 2238. The rake face 2386 extends from the tip 2382 at a leading rake angle H relative to a plane 2334 defined by tips 2306 of the cutting teeth 2250. The leading rake angle H, measured through the leading tooth 2374, is a negative rake angle such that the leading tooth 2374 is a negative rake tooth. In the illustrated embodiment, the leading rake angle H is approximately 95 to 105 degrees.

As shown in FIG. 25, the tip 2382 of the leading tooth 2374 is spaced a distance U from the tip 2306 of the nearest cutting tooth 2050. In the illustrated embodiment, the distance U is generally the same as a distance P (i.e., the pitch) between the tips 2306 of adjacent cutting teeth 2050. As such, the leading gullet 2390 is generally the same size as gullets 2314 defined by the plurality of cutting teeth 2050.

The plunge point 2254 also includes a top edge 2402 extending from the end 2398 of the body 2238 to a back portion 2274 of the body 2238. The illustrated top edge 2402 is an elongated edge that is oriented at an angle G relative to the back portion 2274 such that the plunge point 2254 is a tapered plunge point. In some embodiments, the angle G is less than 15 degrees. In the illustrated embodiment, the angle G is approximately 8 degrees.

Although not shown, in some embodiments, each of the cutting teeth 2250 may include a protrusion that inhibits a nail from entering the gullet 2314 and contacting a rake face 2310 of an adjacent cutting tooth 2050.

Figure 26:
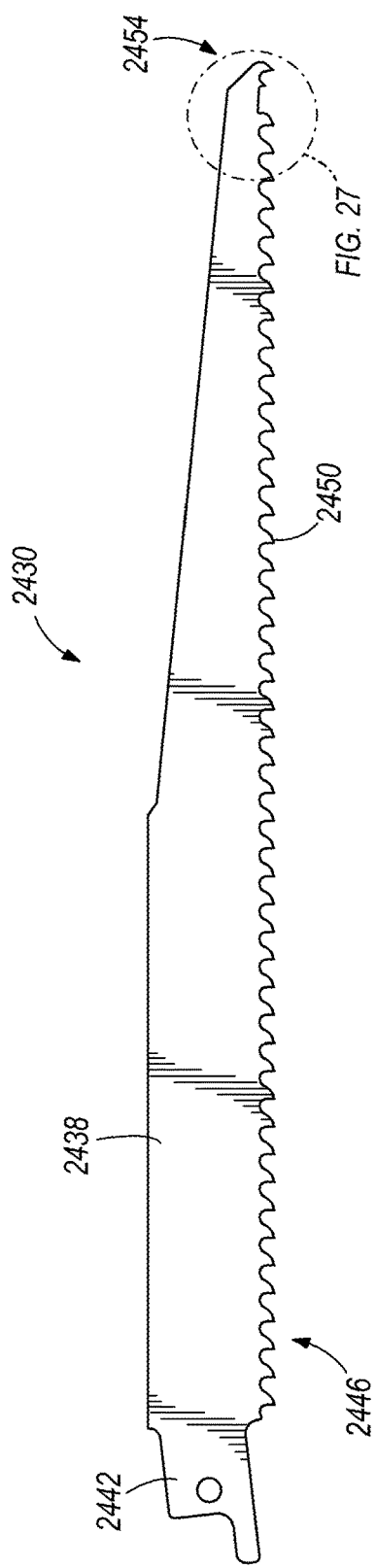
FIG. 26 is a side view of a saw blade according to another embodiment of the invention.
Figure 27:
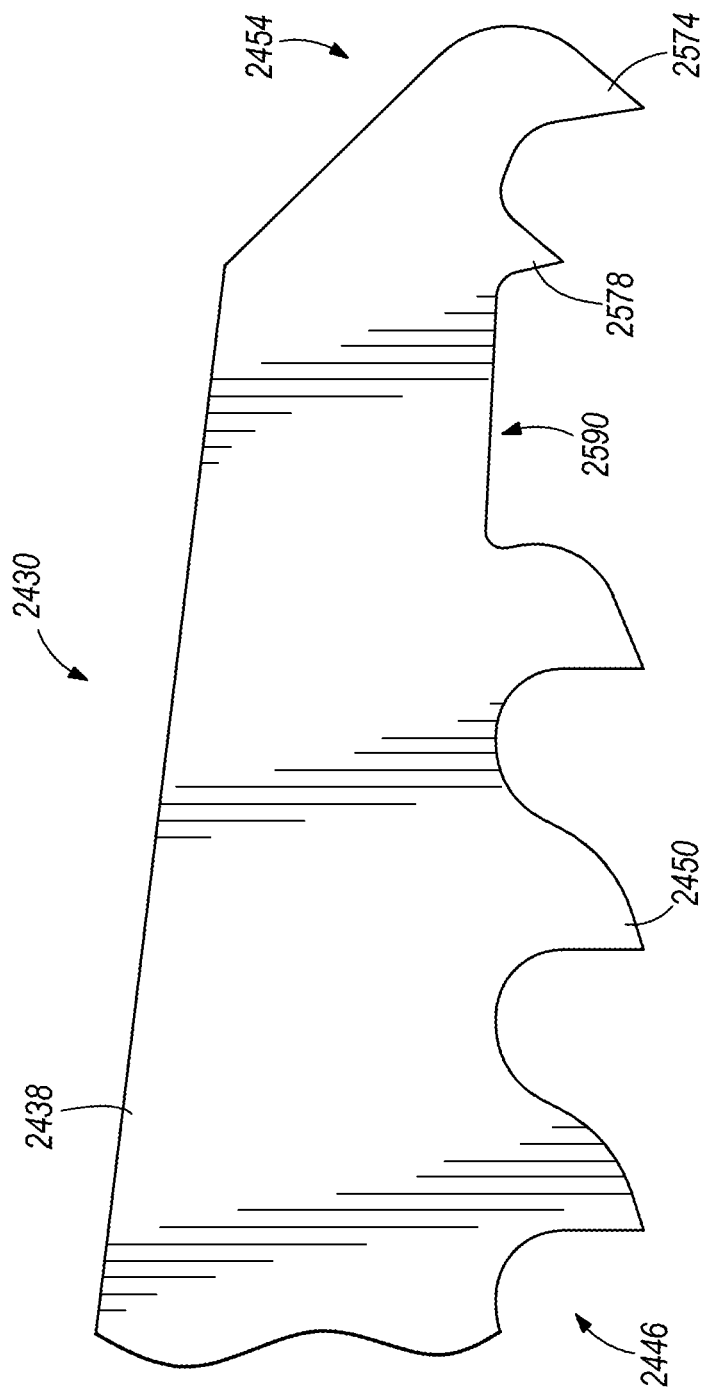
FIG. 27 is an enlarged side view of a portion of the saw blade shown in FIG. 26.

FIGS. 26-27 illustrate a reciprocating saw blade 2430 according to another embodiment of the invention. The illustrated saw blade 2430 is similar to the saw blade 30 described above with reference to FIGS. 1-4, and similar parts have been given the same reference numbers, plus 2400.

The illustrated saw blade 2430 includes a body 2438, an attachment portion 2442 for coupling the blade 2430 to a reciprocating saw, a cutting portion 2446 having a plurality of cutting teeth 2450, and a plunge point 2454 for initiating a plunge cut. The plunge point 2454 is similar to the plunge point 54 shown in FIGS. 1-4 and includes a leading tooth 2574, a second tooth 2578, and an enlarged leading gullet 2590. However, in the illustrated embodiment, each cutting tooth 2450 does not include a protrusion.

Figure 29:
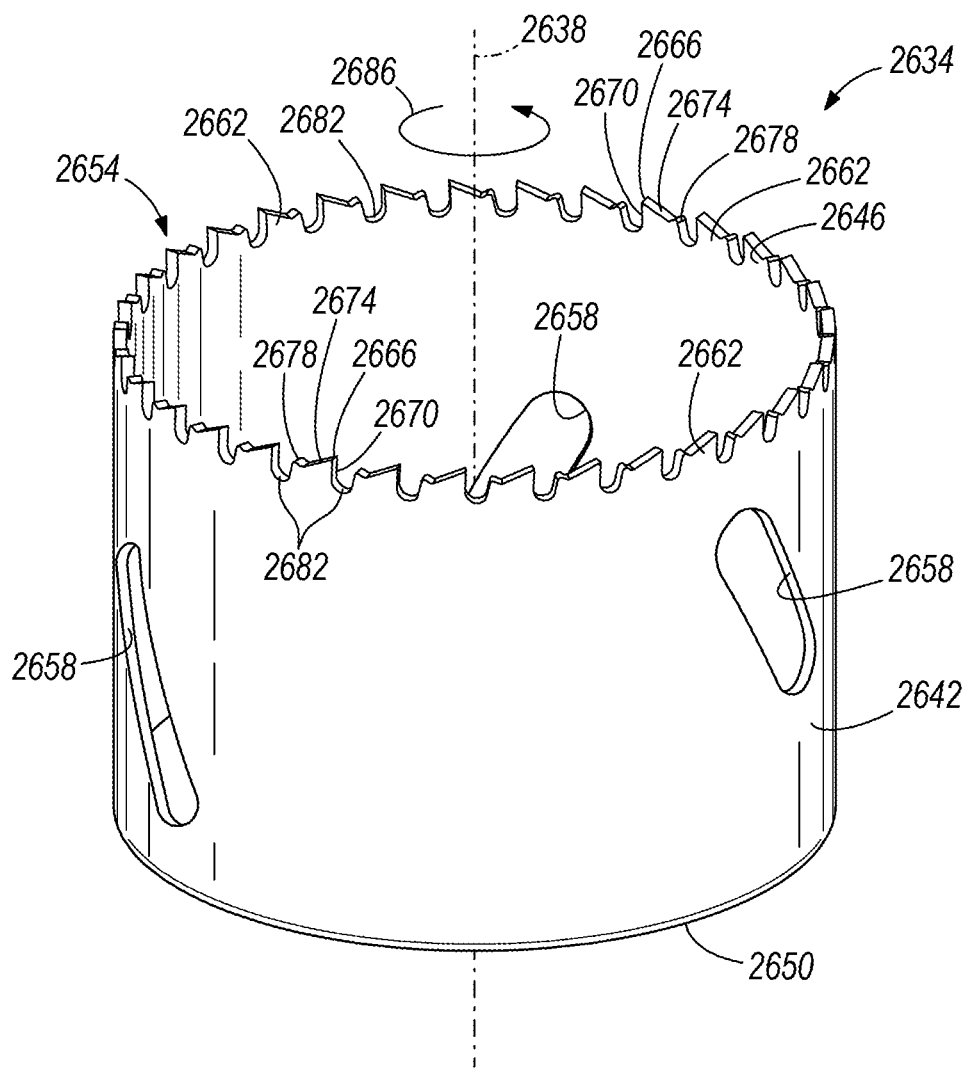
FIG. 29 is a perspective view of a saw blade according to another embodiment of the invention.

FIG. 29 illustrates a saw blade 2634 according to another embodiment of the invention. The illustrated saw blade 2634 is a hole saw. The hole saw 2634 may be connected to a power tool, such as a drill, and rotated about a longitudinal axis 2638 to cut a hole in a work piece.

The hole saw 2634 includes a generally cylindrical body 2642 having an open end 2646 and a closed end 2650. The open end 2646 defines a cutting portion 2654 that engages the work piece during cutting. The closed end 2650 is configured to mount to an arbor, or other suitable connecting structure, to attach the hole saw 2634 to a power tool. Three openings 2658 are formed in the body 2642 to facilitate chip and plug removal from the body 2642. The illustrated openings 2658 are completely bound by the body 2642 and angled relative to the longitudinal axis 2638. In other embodiments, the body 2642 may define fewer or more openings 2658, and/or the openings 2658 may extend generally parallel to the axis 2638. In some embodiments, the openings 2658 may extend to and communicate with the open end 2646 of the body 2642.

The cutting portion 2654 includes a plurality of cutting teeth 2662. The illustrated cutting teeth 2662 are similar to the cutting teeth 50 shown in FIGS. 1-4, but, rather than being arranged in a straight line, are arranged in a continuous circle on the open end 2646 of the body 2642. Similar to the cutting teeth 50 discussed above, each cutting tooth 2662 includes a tip 2666, a rake face 2670, a relief surface 2674, and a protrusion 2678. The protrusions 2678 inhibit nails from entering gullets 2682 between adjacent cutting teeth 2662 when the hole saw 2634 is rotated in a cutting direction 2686 about the longitudinal axis 2638. In particular, the protrusions 2678 define a plane (similar to the plane 158 of FIG. 3) that is at most spaced approximately 0.035 inches, and preferably approximately 0.032 inches, from a plane (similar to the plane 134 of FIG. 3) defined by the tips 2666. In addition, each protrusion 2678 defines an effective relief surface (similar to the effective relief surfaces 162 of FIG. 3) that is at most spaced approximately 0.06 inches, and preferably approximately 0.05 inches, from an adjacent effective relief surface (if the body 2642 of the hole saw 2634 was flattened out). Other dimensions and angles of the illustrated cutting teeth 2662 may also be similar to the dimensions and angles of the cutting teeth 50 shown in FIG. 3.

Although particular embodiments embodying independent aspects of the present invention have been shown and described, other alternative embodiments will become apparent to those skilled in the art and are within the intended scope of the independent aspects of the invention. For example, although the above saw blade tooth forms have been described with reference to saw blades for use with reciprocating saws that alternately move the saw blades in cutting directions and return directions, the tooth forms may be used on other types of saw blades having a linear edge, including band saw blades and jig saw blades. In addition, the tooth forms may additionally be used on saw blades having a curved edge, including circular saws blades.

Various features and advantages of the invention are set forth in the following claims.

The invention claimed is:

1. A reciprocating saw blade for use with a reciprocating saw, the reciprocating saw blade comprising:
a body defining a longitudinal axis;
an attachment portion coupled to the body, the attachment portion including a tang and an aperture configured to couple to the reciprocating saw; and
a cutting portion formed on the body, the cutting portion including a plurality of cutting teeth and a plurality of gullets positioned between the plurality of cutting teeth, each cutting tooth including a tip, a rake face extending from the tip generally toward the longitudinal axis and at least partially defining one of the plurality of gullets, a relief surface extending from the tip, and a protrusion extending from an end of the relief surface opposite the tip;
wherein each gullet includes a base, a first curved surface extending from the rake face of a corresponding cutting tooth to the base, and a second curved surface extending from the base to an adjacent cutting tooth, and wherein the protrusion of each cutting tooth is located on the cutting tooth between the relief surface of the cutting tooth and the second curved surface of an adjacent gullet;

wherein the tips of the plurality of cutting teeth define a first plane that is generally parallel to the longitudinal axis and the protrusions of the plurality of cutting teeth define a second plane that is generally parallel to the longitudinal axis, and wherein a distance between the first plane and the second plane is at most approximately 0.035 inches; and wherein a distance between the protrusion of one cutting tooth and the tip of an adjacent cutting tooth, measured generally parallel to the longitudinal axis, is approximately 0.08 inches.

2. The reciprocating saw blade of claim 1, wherein the distance between the first plane and the second plane is approximately 0.032 inches.

3. The reciprocating saw blade of claim 1, wherein the reciprocating saw blade is configured to cut a work piece having a nail extending therethrough, and wherein the protrusion of each cutting tooth inhibits the nail from entering the gullet and contacting the rake face of an adjacent cutting tooth during cutting operations.

4. The reciprocating saw blade of claim 1, wherein adjacent cutting teeth of the plurality of cutting teeth are separated by a pitch of approximately 0.2 inches.

5. The reciprocating saw blade of claim 1, wherein the protrusion of each cutting tooth is generally rounded.

6. The reciprocating saw blade of claim 1, wherein the relief surface of each cutting tooth includes a first end that is closer to the attachment portion and a second end that is further from the attachment portion, and wherein the tip of each cutting tooth is formed at the first end of the relief surface and the protrusion of each cutting tooth extends from the second end of the relief surface.

7. A reciprocating saw blade for use with a reciprocating saw, the reciprocating saw blade comprising:

a body defining a longitudinal axis;

an attachment portion coupled to the body, the attachment portion including a tang and an aperture configured to couple to the reciprocating saw; and a cutting portion formed on the body, the cutting portion including a plurality of cutting teeth and a plurality of gullets positioned between the plurality of cutting teeth, each cutting tooth including a tip, a rake face extending from the tip generally toward the longitudinal axis and at least partially defining one of the plurality of gullets, a relief surface extending from the tip, and a protrusion extending from an end of the relief surface opposite the tip, each cutting tooth defining an effective relief surface that extends from the tip and is tangent to the protrusion;

wherein each gullet includes a base, a first curved surface extending from the rake face of a corresponding cutting tooth to the base, and a second curved surface extending from the base to an adjacent cutting tooth, and wherein the protrusion of each cutting tooth is located on the cutting tooth between the relief surface of the cutting tooth and the second curved surface of an adjacent gullet;

wherein a distance between effective relief surfaces of adjacent cutting teeth is at most approximately 0.06 inches.

8. The reciprocating saw blade of claim 7, wherein the distance between effective relief surfaces of adjacent cutting teeth is approximately 0.05 inches.

9. The reciprocating saw blade of claim 7, wherein the tips of the plurality of cutting teeth define a plane that is generally parallel to the longitudinal axis, and wherein the effective relief surface of each cutting tooth intersects the plane at an angle of approximately 14.5 degrees.

10. The reciprocating saw blade of claim 7, wherein the reciprocating saw blade is configured to cut a work piece having a nail extending therethrough, and wherein the protrusion of each cutting tooth inhibits the nail from entering the gullet and contacting the rake face of an adjacent cutting tooth during cutting operations.

11. The reciprocating saw blade of claim 7, wherein adjacent cutting teeth of the plurality of cutting teeth are separated by a pitch of approximately 0.2 inches.

12. The reciprocating saw blade of claim 7, wherein the protrusion of each cutting tooth is generally rounded.

13. The reciprocating saw blade of claim 7, wherein the relief surface of each cutting tooth includes a first end that is closer to the attachment portion and a second end that is further from the attachment portion, and wherein the tip of each cutting tooth is formed at the first end of the relief surface and the protrusion of each cutting tooth extends from the second end of the relief surface.

14. The reciprocating saw blade of claim 13, wherein the relief surface of each cutting tooth extends approximately 0.1 inches from the first end to the second end.

15. A reciprocating saw blade for use with a reciprocating saw, the reciprocating saw blade comprising:

a body defining a longitudinal axis;

an attachment portion coupled to the body, the attachment portion including a tang and an aperture configured to couple to the reciprocating saw, the attachment portion being angled relative to the longitudinal axis by a tang angle; and a cutting portion formed on the body, the cutting portion including a plurality of cutting teeth and a plurality of gullets positioned between the plurality of cutting teeth, each cutting tooth including a tip, a rake face extending from the tip generally toward the longitudinal axis and at least partially defining one of the plurality of gullets, a relief surface extending from the tip, and a protrusion extending from an end of the relief surface opposite the tip, each cutting tooth defining an effective relief surface that extends from the tip and is tangent to the protrusion;

wherein each gullet includes a base, a first curved surface extending from the rake face of a corresponding cutting tooth to the base, and a second curved surface extending from the base to of an adjacent cutting tooth, and wherein the protrusion of each cutting tooth is located on the cutting tooth between the relief surface of the cutting tooth and the second curved surface of an adjacent gullet;

wherein the tips of the plurality of cutting teeth define a plane that is generally parallel to the longitudinal axis, wherein the relief surface of each cutting tooth intersects the plane at a relief angle and the effective relief surface of each cutting tooth intersects the plane at an effective relief angle, and wherein the effective relief angle has a value that is between a value of the tang angle and a value of the relief angle.

16. The reciprocating saw blade of claim 15, wherein the tang angle is approximately 6.5 degrees and the relief angle of each cutting tooth is approximately 23 degrees.

17. The reciprocating saw blade of claim 16, wherein the effective relief angle of each cutting tooth is approximately 14.5 degrees.

18. The reciprocating saw blade of claim 15, wherein a ratio between the relief angle and the effective relief angle of each cutting tooth is approximately 1.6.

19. The reciprocating saw blade of claim 15, wherein a ratio between the effective relief angle, in degrees, of each cutting tooth and a distance, in inches, between effective relief surfaces of adjacent cutting teeth is approximately 290.

20. The reciprocating saw blade of claim 15, wherein a ratio between a distance from the protrusion of one cutting tooth to the tip of an adjacent cutting tooth, measured generally parallel to the longitudinal axis, and a distance between effective relief surfaces of adjacent cutting teeth is approximately 1.6.

21. The reciprocating saw blade of claim 15, wherein the reciprocating saw blade is configured to cut a work piece having a nail extending therethrough, and wherein the protrusion of each cutting tooth inhibits the nail from entering the gullet and contacting the rake face of an adjacent cutting tooth during cutting operations.

22. The reciprocating saw blade of claim 15, wherein adjacent cutting teeth of the plurality of cutting teeth are separated by a pitch of approximately 0.2 inches.

23. The reciprocating saw blade of claim 15, wherein the protrusion of each cutting tooth is generally rounded.

24. The reciprocating saw blade of claim 15, wherein the relief surface of each cutting tooth includes a first end that is closer to the attachment portion and a second end that is further from the attachment portion, and wherein the tip of each cutting tooth is formed at the first end of the relief surface and the protrusion of each cutting tooth extends from the second end of the relief surface.

25. A reciprocating saw blade for use with a reciprocating saw, the reciprocating saw blade configured to cut a work piece having a nail extending therethrough, the reciprocating saw blade comprising:
   a body defining a longitudinal axis;
   an attachment portion coupled to the body, the attachment portion including a tang and an aperture configured to couple to the reciprocating saw, the attachment portion being angled relative to the longitudinal axis by a tang angle; and
   a cutting portion formed on the body, the cutting portion including a plurality of cutting teeth and a plurality of gullets positioned between the plurality of cutting teeth, each cutting tooth including a tip, a rake face extending from the tip generally toward the longitudinal axis and at least partially defining one of the plurality of gullets, a relief surface extending from the tip, and a protrusion extending from an end of the relief surface opposite the tip, the protrusion of each cutting tooth inhibiting the nail from entering the gullet and contacting the rake face of an adjacent cutting tooth during cutting operations, each cutting tooth defining an effective relief surface that extends from the tip and is tangent to the protrusion;
   wherein each gullet includes a base, a first curved surface extending from the rake face of a corresponding cutting tooth to the base, and a second curved surface extending from the base to an adjacent cutting tooth, and wherein the protrusion of each cutting tooth is located on the cutting tooth between the relief surface of the cutting tooth and the second curved surface of an adjacent gullet;
   wherein the tips of the plurality of cutting teeth define a first plane that is generally parallel to the longitudinal axis and the protrusions of the plurality of cutting teeth define a second plane that is generally parallel to the longitudinal axis, wherein a distance between the first plane and the second plane is at most approximately 0.035 inches;
   wherein a distance between effective relief surfaces of adjacent cutting teeth is at most approximately 0.06 inches; and
   wherein the relief surface of each cutting tooth intersects the first plane at a relief angle and the effective relief surface of each cutting tooth intersects the first plane at an effective relief angle, and wherein the effective relief angle has a value that is between a value of the tang angle and a value of the relief angle.

26. The reciprocating saw blade of claim 25, wherein the distance between the first plane and the second plane is approximately 0.032 inches.

27. The reciprocating saw blade of claim 26, wherein a distance between the protrusion of one cutting tooth and the tip of an adjacent cutting tooth, measured generally parallel to the longitudinal axis, is approximately 0.08 inches.

28. The reciprocating saw blade of claim 25, wherein the distance between effective relief surfaces of adjacent cutting teeth is approximately 0.05 inches.

29. The reciprocating saw blade of claim 25, wherein the tang angle is approximately 6.5 degrees and the relief angle of each cutting tooth is approximately 23 degrees.

30. The reciprocating saw blade of claim 29, wherein the effective relief angle of each cutting tooth is approximately 14.5 degrees.

31. The reciprocating saw blade of claim 25, wherein adjacent cutting teeth of the plurality of cutting teeth are separated by a pitch of approximately 0.2 inches.

32. The reciprocating saw blade of claim 25, wherein the protrusion of each cutting tooth is generally rounded.

* * * * *